(12) United States Patent
Sharma et al.

(10) Patent No.: US 12,500,436 B2
(45) Date of Patent: Dec. 16, 2025

(54) CONTROLLER, SYSTEM, AND METHOD FOR MANAGING DISCHARGE OR CHARGE OF HETEROGENEOUS BATTERY PACKS

(71) Applicants: China Energy Investment Corporation Limited, Beijing (CN); National Institute of Clean-and-Low-Carbon Energy, Beijing (CN)

(72) Inventors: Ratnesh Sharma, Fremont, CA (US); Surinder Singh, Fremont, CA (US); Brandon Ohara, Mountain View, CA (US); Motoko Furukawa, San Jose, CA (US); Roger Keyes, Mission, KS (US)

(73) Assignees: China Energy Investment Corporation Limited, Beijing (CN); National Institute of Clean-And-Low-Carbon Energy, Beijing (CN)

( * ) Notice: Subject to any disclaimer, the term of this patent is extended or adjusted under 35 U.S.C. 154(b) by 626 days.

(21) Appl. No.: 17/506,137

(22) Filed: Oct. 20, 2021

(65) Prior Publication Data

US 2023/0119821 A1    Apr. 20, 2023

(51) Int. Cl.
H02J 7/00         (2006.01)
H01M 10/44        (2006.01)
(Continued)

(52) U.S. Cl.
CPC ..... *H02J 7/007182* (2020.01); *H01M 10/441* (2013.01); *H02J 3/003* (2020.01);
(Continued)

(58) Field of Classification Search
CPC ........ H02J 7/007182; H02J 3/003; H02J 3/32; H02J 7/00036; H02J 7/0025; H02J 7/0047; H01M 10/441
(Continued)

(56) References Cited

U.S. PATENT DOCUMENTS 5,214,385 A * 5/1993 Gabriel ............ G01R 19/16542
                                                324/426
5,668,463 A * 9/1997 Duley ..................... H02J 7/342
                                                307/66
(Continued)

FOREIGN PATENT DOCUMENTS

AU    2018236771 B2   10/2018
CN    104935045 B      9/2015
(Continued)

OTHER PUBLICATIONS mpowerUk.com ("State of Charge [SOC] Determination", mpoweruk.com/soc.htm, accessed online Mar. 8, 2024, published online [according to google.com] Sep. 15, 2015) (Year: 2015).*
(Continued)

*Primary Examiner* — John T Trischler
(74) *Attorney, Agent, or Firm* — Calfee, Halter & Griswold LLP

(57) ABSTRACT

A controller, a system including such a controller, and a method for controlling or managing discharge or charge of a plurality of battery packs are provided. The controller includes one or more processor and at least one tangible, non-transitory machine readable medium encoded with one or more programs configured to perform steps to determining a voltage distribution parameter of each battery pack based on its maximum voltage, its minimum voltage for discharge, and a present voltage, assign ranks to the plurality of battery packs based on the voltage distribution parameters, and determine a respective power discharge or charge
(Continued)

based on the rank of each battery pack and a total power demand. The controller provides signals with instructions to the plurality of battery packs and/or the one or more power converters for discharging power from or charging power to the plurality of battery packs.

18 Claims, 14 Drawing Sheets

(51) Int. Cl.
    *H02J 3/00*            (2006.01)
    *H02J 3/32*            (2006.01)

(52) U.S. Cl.
    CPC ............ *H02J 3/32* (2013.01); *H02J 7/00036* (2020.01); *H02J 7/0025* (2020.01); *H02J 7/0047* (2013.01); *H01M 2220/20* (2013.01)

(58) Field of Classification Search
    USPC ........................................................ 320/124
    See application file for complete search history.

(56) References Cited

U.S. PATENT DOCUMENTS

| | | | | |
|---|---|---|---|---|
| 5,959,368 A * | 9/1999 | Kubo | ................ | H02J 1/102 307/29 |
| 6,232,744 B1 * | 5/2001 | Kawai | ................ | G01R 31/396 320/132 |
| 6,462,511 B1 * | 10/2002 | Kwok | ................ | B60L 58/18 320/141 |
| 6,483,204 B2 * | 11/2002 | Hanaki | ................ | H02J 7/342 307/29 |
| 7,049,756 B2 * | 5/2006 | Aiba | ................ | B41J 2/04596 315/176 |
| 7,274,116 B2 * | 9/2007 | Inoue | ................ | H02J 7/007182 307/100 |
| 7,750,505 B2 * | 7/2010 | Ichikawa | ................ | B60L 50/61 320/128 |
| 7,933,694 B2 * | 4/2011 | Kato | ................ | B60K 6/365 320/135 |
| 7,952,224 B2 * | 5/2011 | Sawada | ................ | B60L 15/2009 903/907 |
| 7,971,345 B2 | 7/2011 | Okumura et al. | | |
| 8,053,921 B2 * | 11/2011 | Ichikawa | ................ | B60L 58/21 307/9.1 |
| 8,269,453 B2 * | 9/2012 | Ludtke | ................ | H01M 10/425 320/128 |
| 8,330,419 B2 * | 12/2012 | Kim | ................ | H01M 10/4257 320/120 |
| 8,344,699 B2 * | 1/2013 | Oyobe | ................ | B60W 20/13 320/152 |
| 8,405,351 B2 * | 3/2013 | Chaturvedi | ......... | H01M 10/441 320/132 |
| 8,423,210 B2 * | 4/2013 | Kato | ................ | B60W 10/26 701/22 |
| 8,427,106 B2 * | 4/2013 | Kim | ................ | H01M 10/482 320/120 |
| 8,473,136 B2 * | 6/2013 | Kato | ................ | B60L 50/62 180/65.21 |
| 8,755,960 B2 * | 6/2014 | McGrogan | ................ | B60K 6/48 701/22 |
| 8,762,189 B2 * | 6/2014 | Bozchalui | ................ | B60L 53/64 705/7.42 |
| 8,823,325 B2 * | 9/2014 | Ling | ................ | G01R 31/3835 320/132 |
| 8,878,491 B2 * | 11/2014 | Shimizu | ................ | H02J 7/0048 320/120 |
| 8,928,287 B2 * | 1/2015 | Abe | ................ | H01M 10/486 702/65 |
| 8,928,288 B2 * | 1/2015 | Abe | ................ | H01M 10/44 320/134 |
| 8,972,765 B1 * | 3/2015 | Krolak | ................ | H02J 7/0018 713/340 |
| 9,020,649 B2 * | 4/2015 | Sharma | ................ | H02J 9/00 700/286 |
| 9,098,817 B2 * | 8/2015 | Asghari | ................ | G06Q 50/06 |
| 9,106,104 B2 * | 8/2015 | Kinjo | ................ | H01M 10/443 |
| 9,225,198 B2 * | 12/2015 | Ishida | ................ | B60L 3/12 |
| 9,367,108 B2 * | 6/2016 | Asghari | ................ | H02J 7/0068 |
| 9,515,355 B2 * | 12/2016 | Ito | ................ | H01M 10/54 |
| 9,568,901 B2 * | 2/2017 | Hooshmand | ............. | H02J 3/00 |
| 9,671,807 B2 * | 6/2017 | Namba | ................ | H02J 3/32 |
| 9,748,765 B2 * | 8/2017 | Huang | ................ | H02J 7/00047 |
| 9,755,440 B2 * | 9/2017 | Ishibashi | ............... | H02J 7/0018 |
| 9,762,066 B2 * | 9/2017 | Majumder | ............. | H02J 13/00 |
| 9,768,642 B2 * | 9/2017 | Shimizu | ................ | H02J 11/00 |
| 9,825,461 B2 * | 11/2017 | Hodrinsky | ............. | H02J 7/342 |
| 9,825,474 B2 * | 11/2017 | Tohara | ................ | H01M 10/441 |
| 9,837,834 B2 * | 12/2017 | Sugiyama | ........... | H02J 7/00714 |
| 9,846,886 B2 * | 12/2017 | Greene | ................ | H02J 3/008 |
| 9,956,888 B2 * | 5/2018 | Ando | ................ | H02M 3/08 |
| 9,979,195 B2 * | 5/2018 | Djan-Sampson | ......... | H02J 3/28 |
| 10,056,757 B2 * | 8/2018 | Sakuma | ............ | H02J 13/00002 |
| 10,079,501 B2 * | 9/2018 | Kudo | ................ | H02J 7/35 |
| 10,263,421 B2 * | 4/2019 | Huang | ................ | H02J 7/36 |
| 10,282,796 B2 * | 5/2019 | ElBsat | ................ | G05B 13/026 |
| 10,333,306 B2 * | 6/2019 | Hooshmand | ........... | G06Q 10/04 |
| 10,333,307 B2 * | 6/2019 | Hooshmand | ........... | G06N 20/00 |
| 10,361,567 B2 * | 7/2019 | Jhunjhunwala | ...... | H02J 7/00712 |
| 10,365,675 B2 * | 7/2019 | Kudo | ................ | H02J 3/381 |
| 10,449,867 B2 * | 10/2019 | Hong | ................ | B60L 50/66 |
| 10,491,010 B2 * | 11/2019 | Shiraki | ................ | H02J 7/35 |
| 10,497,072 B2 * | 12/2019 | Hooshmand | ........... | G06Q 50/06 |
| 10,511,179 B2 * | 12/2019 | Sharma | ................ | H02J 3/00 |
| 10,594,146 B2 * | 3/2020 | Shibata | ................ | H02J 7/0036 |
| 10,634,725 B2 * | 4/2020 | Asghari | ................ | H02J 7/00 |
| 10,637,247 B2 * | 4/2020 | Asghari | ................ | H02J 7/0013 |
| 10,642,333 B2 * | 5/2020 | Krishnakumar | ....... | G06F 1/3212 |
| 10,673,241 B2 * | 6/2020 | Nakayama | ............. | H02J 3/381 |
| 10,673,242 B2 * | 6/2020 | Nakayama | ............. | G06Q 50/06 |
| 10,673,271 B2 * | 6/2020 | Krishnakumar | .......... | G06F 1/26 |
| 10,680,455 B2 * | 6/2020 | Hooshmand | ........... | G06Q 50/06 |
| 10,766,371 B1 * | 9/2020 | Duan | ................ | B60L 50/00 |
| 10,784,702 B2 * | 9/2020 | Kudo | ................ | H02J 3/32 |
| 10,793,019 B2 * | 10/2020 | Duan | ................ | H02J 7/0016 |
| 10,855,080 B2 * | 12/2020 | Kudo | ................ | H02J 3/003 |
| 10,868,425 B1 * | 12/2020 | Porter | ................ | H02J 3/32 |
| 10,909,642 B2 * | 2/2021 | ElBsat | ................ | G06Q 50/06 |
| 10,910,606 B2 * | 2/2021 | Crowley | ................ | H02M 7/12 |
| 10,916,945 B2 * | 2/2021 | Kudo | ................ | H02J 3/38 |
| 10,931,129 B2 * | 2/2021 | Wilhide | ................ | H02M 1/44 |
| 10,958,074 B2 * | 3/2021 | Berkowitz | ............ | H02J 3/1807 |
| 11,010,846 B2 * | 5/2021 | ElBsat | ................ | H02J 3/381 |
| 11,069,926 B1 * | 7/2021 | Kohn | ................ | B60L 58/10 |
| 11,106,260 B2 * | 8/2021 | Ivanov | ................ | G06F 3/04847 |
| 11,136,008 B2 * | 10/2021 | Lai | ................ | B60L 53/305 |
| 11,177,515 B2 * | 11/2021 | Combs | ................ | H01M 10/482 |
| 11,217,832 B2 * | 1/2022 | Adachi | ................ | H01M 4/587 |
| 11,258,258 B2 * | 2/2022 | Jensen | ................ | H02J 3/38 |
| 11,495,982 B2 * | 11/2022 | Trela | ................ | H02J 7/0013 |
| 11,552,491 B2 * | 1/2023 | Lim | ................ | H02J 7/00034 |
| 11,625,088 B2 * | 4/2023 | Kim | ................ | G06F 1/3243 713/300 |
| 11,652,357 B1 * | 5/2023 | Sharma | ................ | H02J 7/0024 307/82 |
| 11,695,298 B2 * | 7/2023 | Fife | ................ | H02J 3/144 700/291 |
| 11,708,005 B2 * | 7/2023 | Nguyen | ................ | G01R 31/374 320/118 |
| 11,735,782 B2 * | 8/2023 | Kamel Ahmed | . | H02J 7/007182 320/137 |
| 11,742,675 B2 * | 8/2023 | Choi | ................ | H02J 3/46 307/29 |
| 11,799,140 B2 * | 10/2023 | Sharma | ................ | H02J 7/0048 |
| 11,848,581 B2 * | 12/2023 | Rentel | ................ | H02J 7/0063 |
| 11,862,978 B2 * | 1/2024 | Watanabe | ................ | H02J 7/02 |
| 11,865,939 B2 * | 1/2024 | Lu | ................ | G06Q 50/06 |
| 11,870,263 B2 * | 1/2024 | Griffith | ................ | H02J 7/00032 |
| 11,881,568 B2 * | 1/2024 | Combs | ................ | H01M 10/482 |

(56) References Cited

U.S. PATENT DOCUMENTS

| | | | | |
|---|---|---|---|---|
| 11,897,362 B2* | 2/2024 | Nguyen | | H02J 7/007182 |
| 11,909,008 B2* | 2/2024 | Tabatowski-Bush | | H04Q 9/00 |
| 11,942,806 B2* | 3/2024 | Ludtke | | H02J 7/0063 |
| 2002/0000793 A1* | 1/2002 | Hanaki | | H02J 7/00036 |
| | | | | 323/234 |
| 2004/0169545 A1* | 9/2004 | Aiba | | H10N 30/802 |
| | | | | 327/530 |
| 2006/0006850 A1* | 1/2006 | Inoue | | H02J 7/007182 |
| | | | | 323/265 |
| 2009/0013521 A1* | 1/2009 | Okumura | | H01M 10/482 |
| | | | | 29/730 |
| 2009/0058329 A1* | 3/2009 | Ichikawa | | B60K 6/26 |
| | | | | 307/82 |
| 2010/0065351 A1* | 3/2010 | Ichikawa | | B60L 58/15 |
| | | | | 903/930 |
| 2010/0096918 A1* | 4/2010 | Sawada | | B60L 58/22 |
| | | | | 307/9.1 |
| 2010/0100264 A1* | 4/2010 | Kato | | B60K 6/365 |
| | | | | 180/65.25 |
| 2010/0100265 A1* | 4/2010 | Kato | | B60L 58/20 |
| | | | | 180/65.21 |
| 2010/0207587 A1* | 8/2010 | Oyobe | | H01M 10/625 |
| | | | | 320/152 |
| 2010/0261043 A1* | 10/2010 | Kim | | H02J 7/0024 |
| | | | | 429/61 |
| 2010/0285339 A1 | 11/2010 | Chaturvedi et al. | | |
| 2010/0292880 A1* | 11/2010 | Mcgrogan | | B60L 58/10 |
| | | | | 701/22 |
| 2011/0210700 A1* | 9/2011 | Shimizu | | H02J 7/0048 |
| | | | | 320/116 |
| 2011/0304298 A1* | 12/2011 | Gow | | H02J 7/00 |
| | | | | 320/138 |
| 2012/0068537 A1* | 3/2012 | Hintz | | B60L 50/40 |
| | | | | 307/43 |
| 2012/0109442 A1* | 5/2012 | Kato | | H02J 7/0024 |
| | | | | 701/22 |
| 2012/0133331 A1* | 5/2012 | Ling | | G01R 31/367 |
| | | | | 320/132 |
| 2012/0133333 A1* | 5/2012 | Morioka | | H02J 7/0049 |
| | | | | 320/134 |
| 2012/0146588 A1* | 6/2012 | Ishibashi | | H02J 7/0018 |
| | | | | 320/138 |
| 2012/0169291 A1* | 7/2012 | Abe | | H02J 7/0018 |
| | | | | 320/134 |
| 2012/0176091 A1* | 7/2012 | Abe | | H02J 7/0029 |
| | | | | 320/132 |
| 2012/0223670 A1* | 9/2012 | Kinjo | | H02J 7/35 |
| | | | | 320/135 |
| 2012/0274268 A1* | 11/2012 | Ishida | | B60L 3/12 |
| | | | | 320/107 |
| 2012/0319493 A1* | 12/2012 | Kim | | H01M 10/4207 |
| | | | | 307/80 |
| 2013/0015702 A1* | 1/2013 | Ito | | H01M 10/54 |
| | | | | 324/426 |
| 2013/0024042 A1* | 1/2013 | Asghari | | H02J 9/00 |
| | | | | 700/295 |
| 2013/0226637 A1* | 8/2013 | Bozchalui | | B60L 53/63 |
| | | | | 705/7.12 |
| 2014/0005852 A1* | 1/2014 | Asghari | | H02J 3/32 |
| | | | | 700/297 |
| 2014/0019188 A1* | 1/2014 | Asghari | | G06Q 10/06315 |
| | | | | 705/7.25 |
| 2014/0021925 A1* | 1/2014 | Asakura | | G01R 31/3648 |
| | | | | 320/126 |
| 2014/0058571 A1* | 2/2014 | Hooshmand | | G05B 15/02 |
| | | | | 700/286 |
| 2014/0350743 A1* | 11/2014 | Asghari | | G05B 13/048 |
| | | | | 700/297 |
| 2014/0365027 A1* | 12/2014 | Namba | | G05F 1/66 |
| | | | | 700/297 |
| 2015/0051747 A1* | 2/2015 | Asghari | | G05B 13/021 |
| | | | | 700/291 |
| 2015/0127425 A1* | 5/2015 | Greene | | G06Q 10/04 |
| | | | | 705/7.31 |
| 2015/0137753 A1* | 5/2015 | Cha | | B60L 58/13 |
| | | | | 320/109 |
| 2015/0192973 A1* | 7/2015 | Hintz | | H02M 3/1582 |
| | | | | 307/80 |
| 2015/0194707 A1* | 7/2015 | Park | | H01M 10/425 |
| | | | | 429/61 |
| 2016/0013670 A1* | 1/2016 | Tohara | | H02J 7/0048 |
| | | | | 320/112 |
| 2016/0049814 A1* | 2/2016 | Sugiyama | | H02J 7/0063 |
| | | | | 320/128 |
| 2016/0052505 A1* | 2/2016 | Zhou | | B60L 15/2045 |
| | | | | 903/930 |
| 2016/0064961 A1* | 3/2016 | DiCarlo | | H02J 7/0048 |
| | | | | 320/157 |
| 2016/0064970 A1* | 3/2016 | Shimizu | | H02J 3/381 |
| | | | | 320/134 |
| 2016/0118795 A1* | 4/2016 | Berkowitz | | G05B 15/02 |
| | | | | 700/286 |
| 2016/0226243 A1* | 8/2016 | Djan-Sampson | | H02J 3/28 |
| 2016/0226249 A1* | 8/2016 | Sakuma | | H02J 13/00034 |
| 2016/0231387 A1* | 8/2016 | Hodges | | G01R 31/389 |
| 2016/0241029 A1* | 8/2016 | Hodrinsky | | H02J 7/342 |
| 2016/0254664 A1* | 9/2016 | Huang | | H02J 7/0025 |
| | | | | 307/52 |
| 2016/0274607 A1* | 9/2016 | Kudo | | G05F 1/66 |
| 2016/0276859 A1* | 9/2016 | Kudo | | H02J 3/38 |
| 2017/0008415 A1* | 1/2017 | Ando | | H02M 7/44 |
| 2017/0110890 A1* | 4/2017 | Ludtke | | H01M 10/425 |
| 2017/0117713 A1* | 4/2017 | Majumder | | H02J 7/34 |
| 2017/0166075 A1* | 6/2017 | Hong | | B60L 58/12 |
| 2017/0214243 A1* | 7/2017 | Rancuret | | H02J 7/0068 |
| 2017/0229876 A1* | 8/2017 | Jhunjhunwala | | B60L 58/16 |
| 2017/0229880 A1* | 8/2017 | Jhunjhunwala | | H02J 7/0025 |
| 2017/0256004 A1* | 9/2017 | Hooshmand | | H02J 3/28 |
| 2017/0310140 A1* | 10/2017 | Asghari | | H02J 3/32 |
| 2017/0317493 A1* | 11/2017 | Huang | | H02J 7/0025 |
| 2018/0076637 A1* | 3/2018 | Shiraki | | H02J 7/0013 |
| 2018/0076638 A1* | 3/2018 | Shibata | | H02J 7/0036 |
| 2018/0090935 A1* | 3/2018 | Asghari | | H02J 7/0013 |
| 2018/0166878 A1* | 6/2018 | Hooshmand | | G06Q 10/04 |
| 2018/0166880 A1* | 6/2018 | Hooshmand | | H02J 7/0013 |
| 2018/0197253 A1* | 7/2018 | ElBsat | | G06Q 30/0284 |
| 2018/0268327 A1* | 9/2018 | Hooshmand | | G05B 15/02 |
| 2018/0366969 A1* | 12/2018 | Kudo | | H02J 3/381 |
| 2019/0056451 A1* | 2/2019 | Asghari | | H02J 7/00712 |
| 2019/0064914 A1* | 2/2019 | Krishnakumar | | G06F 1/3234 |
| 2019/0073012 A1* | 3/2019 | Sultenfuss | | H02J 7/0068 |
| 2019/0074693 A1* | 3/2019 | Kudo | | H02J 3/003 |
| 2019/0074708 A1* | 3/2019 | Krishnakumar | | H02J 7/0013 |
| 2019/0086983 A1* | 3/2019 | Sharma | | H02J 4/00 |
| 2019/0123561 A1* | 4/2019 | Kudo | | H02J 13/00 |
| 2019/0131923 A1* | 5/2019 | Hooshmand | | H02J 3/003 |
| 2019/0137956 A1* | 5/2019 | Hooshmand | | G05B 13/042 |
| 2019/0140465 A1* | 5/2019 | Hooshmand | | H02J 7/0069 |
| 2019/0147552 A1* | 5/2019 | Nakayama | | H02J 3/38 |
| | | | | 700/291 |
| 2019/0148945 A1* | 5/2019 | Nakayama | | H02J 3/38 |
| | | | | 700/291 |
| 2019/0202416 A1* | 7/2019 | Lai | | B60L 53/68 |
| 2019/0206000 A1* | 7/2019 | ElBsat | | H02J 3/381 |
| 2019/0213695 A1* | 7/2019 | ElBsat | | G06Q 30/0284 |
| 2019/0250689 A1* | 8/2019 | Ivanov | | G06F 1/3203 |
| 2019/0288513 A1* | 9/2019 | Nakayama | | G06Q 30/0206 |
| 2019/0326763 A1* | 10/2019 | Wilhide | | B60L 58/22 |
| 2019/0363311 A1* | 11/2019 | Crowley | | H02J 7/0048 |
| 2019/0369166 A1* | 12/2019 | Moslemi | | H02J 3/144 |
| 2020/0055405 A1* | 2/2020 | Duan | | H02J 7/0014 |
| 2020/0212511 A1* | 7/2020 | Adachi | | H02J 7/007182 |
| 2020/0220382 A1* | 7/2020 | Carter | | G06Q 10/06 |
| 2020/0269704 A1* | 8/2020 | Duan | | B60L 58/15 |
| 2020/0303929 A1* | 9/2020 | Watanabe | | H02J 7/02 |
| 2020/0350640 A1* | 11/2020 | Combs | | B64D 27/24 |
| 2020/0389030 A1* | 12/2020 | Porter | | H02J 3/1807 |
| 2021/0006075 A1* | 1/2021 | Rentel | | H02J 7/0024 |
| 2021/0006076 A1* | 1/2021 | Rentel | | H02J 7/0024 |
| 2021/0050725 A1* | 2/2021 | Jensen | | H02J 3/388 |

(56) References Cited

U.S. PATENT DOCUMENTS

| | | | |
|---|---|---|---|
| 2021/0126299 A1* | 4/2021 | Ludtke | H01M 10/425 |
| 2021/0242704 A1* | 8/2021 | Lim | B60L 53/62 |
| 2021/0296925 A1* | 9/2021 | Long | H02J 7/0031 |
| 2021/0344225 A1* | 11/2021 | Carter | H02J 3/00 |
| 2021/0382117 A1* | 12/2021 | Shiu | G01R 31/367 |
| 2021/0399352 A1* | 12/2021 | Kamel Ahmed | H01M 10/441 |
| 2022/0063433 A1* | 3/2022 | Lu | B60L 58/12 |
| 2022/0069605 A1* | 3/2022 | Trela | H02J 7/0025 |
| 2022/0077516 A1* | 3/2022 | Combs | H01M 10/482 |
| 2022/0085638 A1* | 3/2022 | Sugizaki | H02J 7/007194 |
| 2022/0149630 A1* | 5/2022 | Burchardt | H02J 3/003 |
| 2022/0158459 A1* | 5/2022 | Choi | H02J 7/0019 |
| 2022/0158468 A1* | 5/2022 | Cha | G01R 31/382 |
| 2022/0209574 A1* | 6/2022 | Fife | H02J 13/00002 |
| 2022/0260646 A1* | 8/2022 | Yamamoto | H02J 7/00032 |
| 2022/0263317 A1* | 8/2022 | Diamond | G06Q 50/06 |
| 2022/0294036 A1* | 9/2022 | Sharma | H02J 7/0013 |
| 2022/0302724 A1* | 9/2022 | Sharma | H02J 3/32 |
| 2022/0344941 A1* | 10/2022 | Griffith | H02J 7/342 |
| 2022/0344959 A1* | 10/2022 | Sharma | H02J 7/0013 |
| 2022/0352725 A1* | 11/2022 | Pmsvvsv | H02J 3/381 |
| 2022/0360091 A1* | 11/2022 | Nguyen | B60L 58/10 |
| 2022/0368135 A1* | 11/2022 | Nguyen | H02J 7/007182 |
| 2022/0368150 A1* | 11/2022 | Sharma | H02J 7/007184 |
| 2022/0384862 A1* | 12/2022 | Tabatowski-Bush | H01M 10/48 |
| 2022/0393492 A1* | 12/2022 | Harris | H02J 7/005 |
| 2022/0416545 A1* | 12/2022 | Diamond | H02J 13/00028 |
| 2023/0009853 A1* | 1/2023 | Kim | G06F 13/4282 |
| 2023/0023119 A1* | 1/2023 | Alipoor | H02J 3/32 |
| 2023/0043269 A1* | 2/2023 | Wang | H01M 10/441 |
| 2023/0058334 A1* | 2/2023 | Alipoor | H02J 3/381 |
| 2023/0076134 A1* | 3/2023 | Xiong | H01M 10/44 |
| 2023/0116469 A1* | 4/2023 | Hau | B60L 53/12 320/109 |
| 2023/0117104 A1* | 4/2023 | Sharma | B60L 55/00 320/109 |
| 2023/0126838 A1* | 4/2023 | Sharma | H02J 7/0048 307/82 |
| 2023/0170508 A1* | 6/2023 | Bulpitt | B60L 15/2045 429/428 |
| 2023/0173938 A1* | 6/2023 | Zhao | H02J 7/0013 320/109 |
| 2023/0291228 A1* | 9/2023 | Fife | H02J 3/48 |
| 2023/0420956 A1* | 12/2023 | Wu | H02J 7/0019 |
| 2024/0001800 A1* | 1/2024 | Altaf | G01R 31/392 |
| 2024/0030731 A1* | 1/2024 | Wu | H02J 7/0048 |
| 2024/0034479 A1* | 2/2024 | Detweiler | B60L 3/0046 |
| 2024/0039302 A1* | 2/2024 | Hwang | H02J 7/00032 |
| 2024/0059172 A1* | 2/2024 | Itaya | H02J 3/004 |
| 2024/0079660 A1* | 3/2024 | Lee | G01R 31/396 |
| 2024/0198854 A1* | 6/2024 | Jeon | B64U 50/34 |

FOREIGN PATENT DOCUMENTS

| | | |
|---|---|---|
| CN | 110518667 A | 11/2019 |
| EP | 2555311 B1 | 2/2016 |
| WO | 2021/019444 A1 | 2/2021 |

OTHER PUBLICATIONS

Extended European search report of application No. 22882212.8 dated Sep. 12, 2025.

* cited by examiner

CONTROLLER, SYSTEM, AND METHOD FOR MANAGING DISCHARGE OR CHARGE OF HETEROGENEOUS BATTERY PACKS

PRIORITY CLAIM AND CROSS-REFERENCE

None.

FIELD OF THE INVENTION

The disclosure relates to systems and methods for controlling or managing battery packs generally. More particularly, the disclosed subject matter relates to a controller, a system, and a method for managing discharge or charge of battery packs, for example, in energy storage application.

BACKGROUND

Clean and renewable sources of energy become more important due to increased concerns about environmental issues such as global warming. Such sources include solar and wind power, and rechargeable battery. Renewable energy sources are intermittent because they cannot always be dispatched when needed to meet the changing requirements of energy consumers. Energy storage systems are expected to solve this flexibility challenge. A stationary energy storage system can store energy and release energy in the form of electricity when it is needed.

SUMMARY OF THE INVENTION

The present disclosure provides a controller for controlling or managing discharge or charge of heterogeneous battery packs, a system such as an electrical energy storage system comprising such a controller, and methods of using the same.

In accordance with some embodiments, the controller, the system, and the method utilize a technique of ranking a plurality of battery packs based on a voltage distribution parameter of each battery pack. The ranking order of the plurality of battery packs is used as an order for discharging power from the system or charging power to the system.

In accordance with some embodiments, a system comprises a plurality of battery packs, one or more power converters, and one or more controller. Each power converter is coupled with at least one of the plurality of battery packs, and is configured to convert direct current (DC) from one battery pack to alternating current (AC) or vice versa. The controller is coupled to the plurality of battery packs and the one or more power converters. In some embodiments, the system may also include more than one controller, and each controller is coupled to a plurality of battery packs.

The plurality of battery packs are defined and described herein. In some embodiments, the plurality packs are heterogeneous battery packs, which can be selected from new batteries, second-use electric vehicle (EV) batteries, or combinations thereof. The plurality of battery packs are connected in parallel, in series, or in a combination (i.e. hybrid combinations) thereof. In some embodiments, the plurality of battery packs are connected in parallel.

The controller comprises one or more processors and at least one tangible, non-transitory machine readable medium encoded with one or more programs configured to perform steps for controlling or managing a discharging process or a charging process of the system having the plurality of battery packs. In some embodiments, these steps include: receiving a total power demand (D) (or called total dispatch power) needed to be dispatched from the system or to be charged to the system, and collecting characteristic data of each battery pack. The characteristic data of each battery pack include a maximum voltage ($V_{i\ max}$), a minimum voltage for discharge ($V_{i\ min}$), and a present voltage ($V_i$). The characteristic data may also include a maximum total rated power ($d_{i\ max}$) of each battery, state of health (SOH), and/or state of charge (SOC).

The steps further include determining a voltage distribution parameter ($V_i^*$) of each battery pack based on $V_{i\ max}$, $V_{i\ min}$, and $V_i$. The steps also include ranking the plurality of battery packs by assigning a rank to each battery pack as an order for discharging or charging based on the voltage distribution parameter ($V_i^*$) for each battery pack, and determining a respective power discharge or charge for each battery pack based on the rank of each battery pack and the total power demand (D).

The steps also further include providing signals with instructions to the plurality of battery packs and the one or more power converters for discharging power from or charging power to the plurality of battery packs based on the respective discharge power of each battery pack and/or keeping a certain battery pack idle.

In some embodiments, the controller is configured to rank the plurality of battery packs in an increasing order, a decreasing order, or a random order of the voltage distribution parameter ($V_i^*$) of each battery pack. The power is discharged or charged in the increasing order, the decreasing order, or the random order of the voltage distribution parameter ($V_i^*$), respectively. The controller is configured to determine the respective power discharge or charge for each battery by assigning the respective power discharge or charge based on a respective maximum total rated power ($d_{i\ max}$) of each battery pack in the order for discharging or charging until the total power demand (D) is reached. After the total power demand is satisfied, other battery packs with lower ranks may not be assigned for discharging or charging, and the respective power discharge or charge is zero. When the respective power discharge or charge of a certain battery pack is zero, the specific battery pack is kept idle without discharging or charging.

In some embodiments, the controller is configured to provide the signal with instructions for a pre-determined time interval, and re-determine the respective power discharge or charge for each battery pack after the time interval ends or when a voltage collapse occurs to a battery pack, by repeating the steps described above. The controller may be configured to dynamically control discharging or charging of the plurality of battery packs by updating the respective power discharge or charge of each battery pack instantaneously with time.

The system may optionally further comprise one or more battery power management unit (BPMU). Each BPMU may be connected with one or more battery packs, and is configured to monitor the one or more battery packs and provide characteristic data of the one or more battery packs to the controller.

In some embodiments, the system is an electrical energy storage system. The total power demand is provided from an upper level energy management system (EMS). In some embodiments, the controller is configured to discharge power from the plurality of battery packs to a grid or load or charge power from the grid or load to the plurality of battery packs. In some embodiments, the grid is optional. The power can be discharged to other components, in which electrical power is needed.

In another aspect, the present disclosure provides a controller as described herein for controlling or managing discharge or charge of a system comprising a plurality of battery packs. As described herein, such a controller comprises one or more processor and at least one tangible, non-transitory machine readable medium encoded with one or more programs configured to perform the steps as described herein.

The controller is configured to provide signals with instructions to the plurality of battery packs and the one or more power converters for discharging power from (or charging power to) the plurality of battery packs based on the respective discharge power of each battery pack and/or keeping a certain battery pack idle.

The plurality of battery packs, which the controller is configured to be coupled with, are heterogeneous battery packs selected from new batteries, second-use electric vehicle (EV) batteries, or combinations thereof. The plurality of battery packs are connected in parallel, in series, or in a combination thereof. The controller is configured to rank the plurality of battery packs in an increasing order, a decreasing order, or a random order of the voltage distribution parameter ($V_i^*$) of each battery pack. The power is discharged or charged in the increasing order, the decreasing order, or the random order of the voltage distribution parameter ($V_i^*$), respectively.

The controller is configured to provide the signal with instructions for a pre-determined time interval, and re-determine the respective power discharge or charge for each battery pack after the time interval ends or when a voltage collapse occurs to a battery pack, by repeating steps. The controller is also configured to dynamically control discharging or charging of the plurality of battery packs by updating the respective power discharge or charge for each battery pack instantaneously with time.

The controller is configured for controlling discharge or charge of heterogeneous battery packs, for example, in an electrical energy storage system. In some embodiments, the controller is configured to discharge power from the plurality of battery packs to a grid or load, or charge power from the grid or load to the plurality of battery packs.

In another aspect, the present disclosure provides a method for controlling or managing discharge or charge of a system comprising a plurality of battery packs through a controller therein as described herein. The method includes steps of: receiving a total power demand (D) needed to be dispatched from the system or to be charged to the system, and collecting characteristic data of each battery pack. The characteristic data of each battery pack include a maximum voltage ($V_{i\ max}$), a minimum voltage for discharge ($V_{i\ min}$), and a present voltage ($V_i$). Other data may include SOH, SOC, and a maximum total rated power ($d_{i\ max}$) of each battery pack.

The method further includes determining a voltage distribution parameter ($V_i^*$) of each battery pack based on $V_{i\ max}$, $V_{i\ min}$, and $V_i$, ranking the plurality of battery packs by assigning a rank to each battery pack as an order for discharging or charging based on the voltage distribution parameter ($V_i^*$) for each battery pack, and determining a respective power discharge or charge for each battery pack based on the rank of each battery pack and the total power demand (D).

In such a method, the controller also provides signals with instructions to the plurality of battery packs and the one or more power converters for discharging power from or charging power to the plurality of battery packs based on the respective power discharge or charge of each battery pack and/or keeping a certain battery pack idle as described herein. In some embodiments, instructions are sent from the controller to each battery pack and/or one or more converter connected with the plurality of battery packs for discharging or charging based on the respective power discharge or charge of each battery pack.

The plurality of battery packs are heterogeneous battery packs selected from new batteries, second-use electric vehicle (EV) batteries, or combinations thereof. The plurality of battery packs are connected in parallel, in series, or in a combination thereof.

In accordance with some embodiments, the voltage distribution parameter ($V_i^*$) of each battery pack is determined using Equation (1):

$$V_i^* = (V_i - V_{i\ min})/(V_{i\ max} - V_{i\ min}) \qquad (1).$$

In some embodiments, the plurality of battery packs are ranked in an increasing order of the voltage distribution parameter ($V_i^*$) of each battery pack. In some other embodiments, the plurality of battery packs are ranked in a decreasing order of the voltage distribution parameter ($V_i^*$) of each battery pack. Alternatively, the plurality of battery packs are ranked in a random order of the voltage distribution parameter ($V_i^*$) of each battery pack. In each scenario, the respective power discharge or charge for each battery is determined by assigning the respective power discharge or charge based on a respective maximum total rated power ($d_{i\ max}$) of each battery pack in the order for discharging or charging until the total power demand (D) is reached. The respective power discharge or charge for other battery packs is zero. A certain battery pack is kept idle when the respective power discharge or charge is assigned to zero.

In some embodiments, some or all the steps above are repeated to re-determine the respective power discharge or charge of each battery pack after a pre-determined time interval ends or when a voltage collapse occurs to a battery pack. The discharging process of the plurality of battery packs can also be dynamically controlled by updating the respective power discharge or charge of each battery pack instantaneously with time.

The system, the controller, and the method provided in the present disclosure offer many advantages. For example, a variety of new and used battery packs having different quality can be used. No pre-selection or dismantle of the battery packs are needed. The plurality of heterogeneous battery packs collectively supply power load to satisfy the power demand while each battery pack may discharge at a different share. As described herein, the system, the controller, and the method selectively extend the life of battery packs having higher or lower V* or the life of all battery packs, and they also offer flexibility in maintaining and upgrading the system as well.

BRIEF DESCRIPTION OF THE DRAWINGS

The present disclosure is best understood from the following detailed description when read in conjunction with the accompanying drawings. It is emphasized that, according to common practice, the various features of the drawings are not necessarily to scale. On the contrary, the dimensions of the various features are arbitrarily expanded or reduced for clarity. Like reference numerals denote like features throughout specification and drawings.

DETAILED DESCRIPTION

Figure 1:
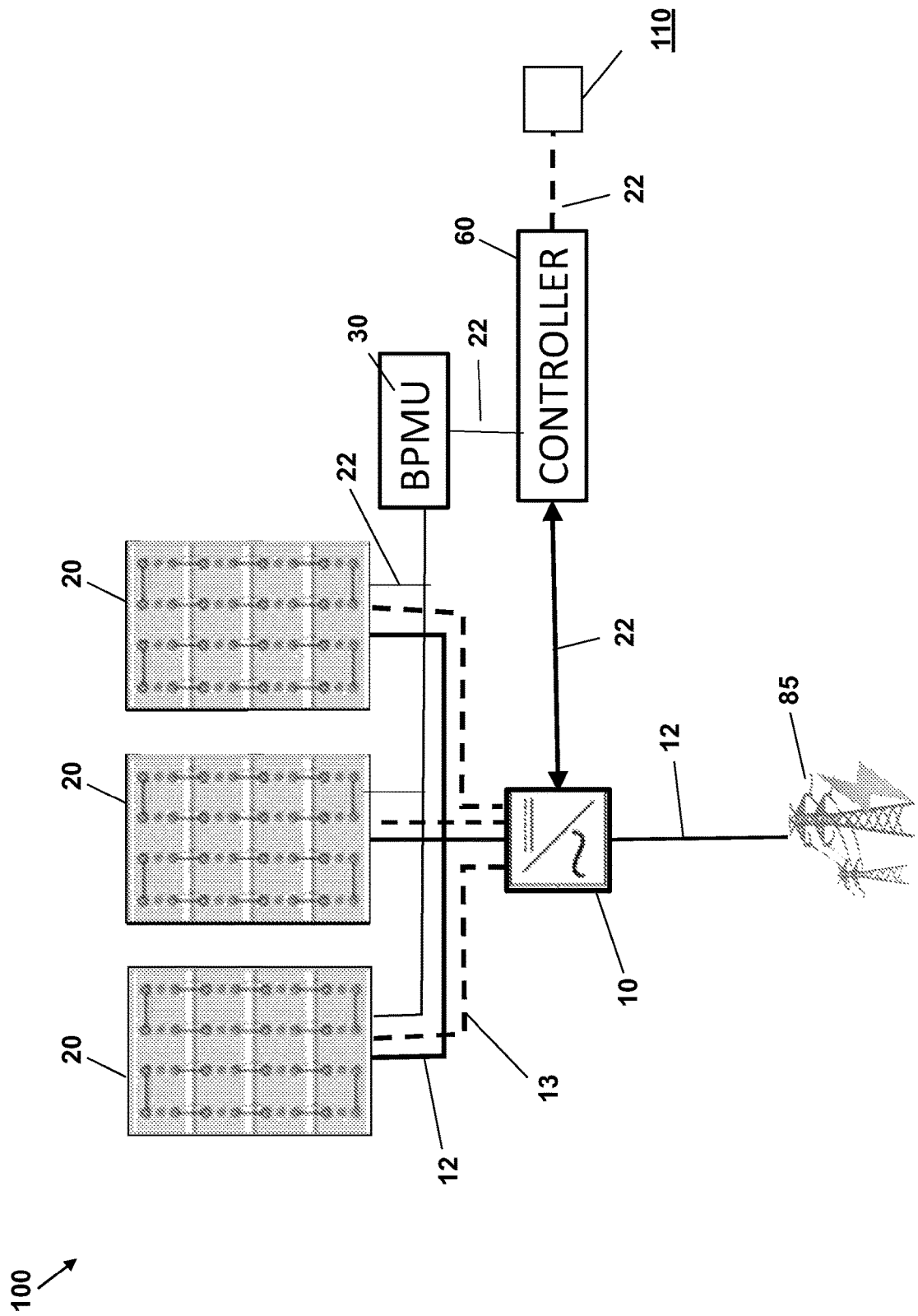
FIG. 1 is a block diagram illustrating an exemplary system comprising heterogeneous battery packs and a controller in accordance with some embodiments.

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

For purposes of the description hereinafter, it is to be understood that the embodiments described below may assume alternative variations and embodiments. It is also to be understood that the specific articles, compositions, and/or processes described herein are exemplary and should not be considered as limiting.

In the present disclosure the singular forms "a," "an," and "the" include the plural reference, and reference to a particular numerical value includes at least that particular value, unless the context clearly indicates otherwise. When values are expressed as approximations, by use of the antecedent "about," it will be understood that the particular value forms another embodiment. As used herein, "about X" (where X is a numerical value) preferably refers to ±10% of the recited value, inclusive. For example, the phrase "about 8" preferably refers to a value of 7.2 to 8.8, inclusive. Where present, all ranges are inclusive and combinable. For example, when a range of "1 to 5" is recited, the recited range should be construed as including ranges "1 to 4", "1 to 3", "1-2", "1-2 & 4-5", "1-3 & 5", "2-5", and the like. In addition, when a list of alternatives is positively provided, such listing can be interpreted to mean that any of the alternatives may be excluded, e.g., by a negative limitation in the claims. For example, when a range of "1 to 5" is recited, the recited range may be construed as including situations whereby any of 1, 2, 3, 4, or 5 are negatively excluded; thus, a recitation of "1 to 5" may be construed as "1 and 3-5, but not 2", or simply "wherein 2 is not included." It is intended that any component, element, attribute, or step that is positively recited herein may be explicitly excluded in the claims, whether such components, elements, attributes, or steps are listed as alternatives or whether they are recited in isolation.

References to "heterogeneous battery packs" made herein refer to battery packs or modules having different capacity, state of charge (SOC), state of heath (SOH), and/or voltages, and can be selected from new batteries (e.g., from different manufacturers), second-use electric vehicle (EV) batteries, or combinations thereof. Second-use EV batteries are used for illustration purpose. References to "discharging" from or "charging" to the plurality of battery packs are understood that the plurality of batteries packs collectively discharge or be charged, while it is possible that some battery packs may stay idle (without charging or discharging).

Unless expressly indicated otherwise, references to "state of health (SOH)" made herein will be understood to mean a figure of merit of the condition of a battery, a battery cell, or a battery pack compared to its ideal conditions. SOH is characterized in percentage (%). The condition matching the specifications under the ideal conditions is 100%. SOH may decrease over time and use.

Unless expressly indicated otherwise, "state of charge" (SOC) described herein is defined as a level of charge of an electric battery relative to its capacity. The units of SOC are percentage points, 0% means empty, and 100% means full.

The term "human machine interface (HMI)" used herein is understood to refer to user interface (UI) is the space where interactions between humans and machines occur. A human-machine interface (HMI) may involve interfaces between human and machines with physical input hardware such as keyboards, mice, or any other human interaction based on tactile, visual, or auditory senses. Such user interfaces may include other layers such as output hardware such as computer monitors, speakers, and printers.

The term "energy management system (EMS)" used herein refers to a system of computer-aided tools used by operators of electric utility grids to monitor, control, and optimize the performance of the generation or transmission system.

In the present disclosure, the terms "power demand," "power dispatch," and "power requirement" are used interchangeably, and can be referred to the power needed for either a discharging or a charging process. The terms "converter" and "inverter" can be used interchangeably. Each battery pack includes an inverter and a battery management unit (BMU) therein. For the convenience of description, the term "power inverter" or "AC/DC power converter" is used to describe the internal component in a battery pack, and the term "power converter" or "power conversion system (PCS)" is used to describe the converter connected with one or more battery packs. The term of "battery management unit (BMU)" or "battery management system (BMS)" is used to describe the internal component in a battery pack, and the term "battery power management unit (BPMU)" is used to describe the battery management unit connected with one or more battery packs.

In the present disclosure, the terms "power" and "energy" are used interchangeably, and the energy are described in a unit of time. Energy and power can be converted with time.

Unless expressly indicated otherwise, the term "connected" or "coupled" used herein are understood to encompass different connections or coupling between or among the components so as to conduct electricity or transmit signals for communication. Such a connection or coupling can be through wire, wireless, or cloud-based modes.

Power dispatch (discharge) is a function of charge flow and voltage. Dispatch energy is defined as dispatch power over a user-specified period of time. Higher voltage discharge provides higher power compared to low voltage discharge for the same amount of charge flow. Earlier approaches have not considered the impact of voltage on the decision of power or energy dispatch. Moreover, heterogeneity in the voltages of battery packs and voltage trajectory during discharge have not been considered.

Heterogeneous battery packs can be pre-sorted before use. For example, batteries or battery packs with similar performance can be sorted in groups to make new battery packs or systems. The state of charge (SOC) can be used as a criterion to sort out the batteries or battery packs. However, this sorting done prior to use is not on a dynamic basis. A more efficient method for using the heterogeneous battery packs is needed.

The present disclosure provides a controller for controlling discharge or charge of heterogeneous battery packs, a system such as an electrical energy storage system comprising such a controller, and methods of using the same. The present disclosure provides such a controller, such a system, and such a method to efficiently utilize heterogeneous batteries such as new batteries from different manufactures or second-use electric vehicle (EV) battery packs in energy storage applications. Every battery pack is operated individually according to its characters such as a voltage distribution parameter. Preselecting or dismantling packs is not required. In accordance with some embodiments, the controller, the system, and the method utilize a technique of ranking a plurality of battery packs based on voltage distribution parameter ($V^*$), other than SOC, of each battery pack. The ranking order of the plurality of battery packs is used as an order for discharging power from the system or charging power to the system. The priority of discharging or charging the discharging for a plurality of battery packs are determined by the voltage distribution parameter as described herein.

The controller, the system, and the method provided in the present disclosure apply to different battery packs. The battery packs may have the same or different chemistries, same or different performance or degradation, same or different physical and/or electrical performances. In some embodiments, the battery packs are heterogeneous battery packs.

Figure 2:
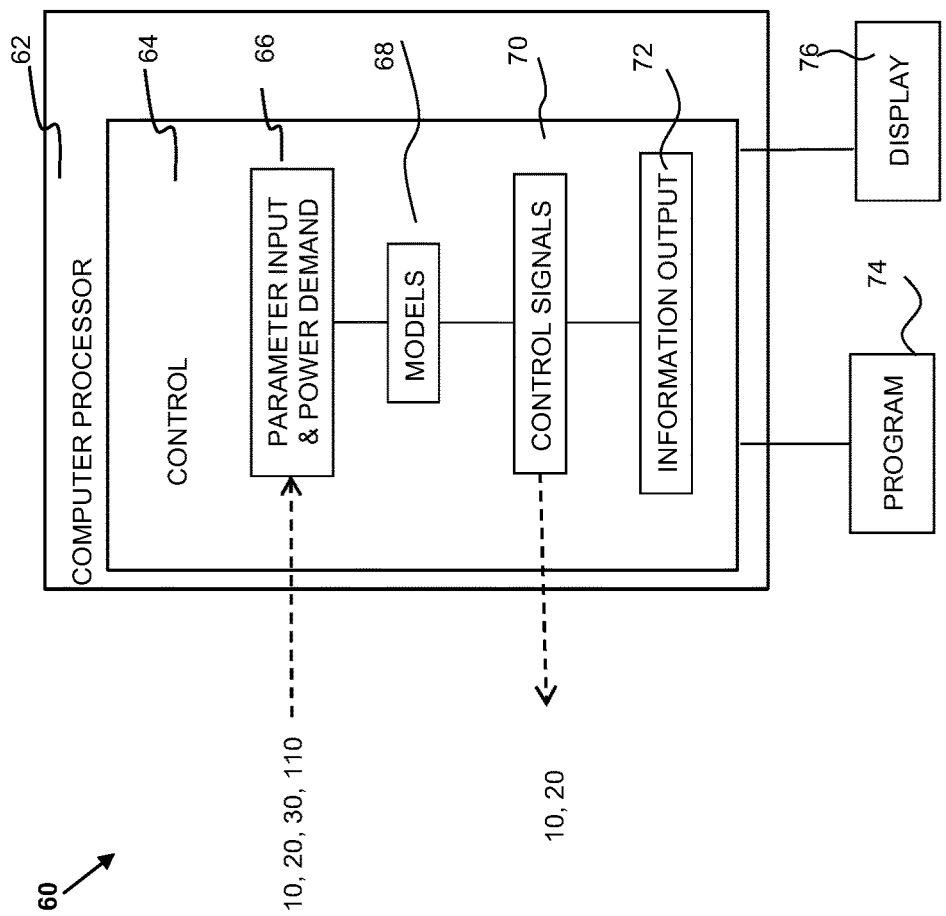
FIG. 2 is a block diagram illustrating an exemplary controller comprising one or more processor and at least one tangible, non-transitory machine readable medium encoded with one or more programs, for controlling or managing discharge or charge of a plurality of heterogeneous battery packs in accordance with some embodiments.

In FIGS. 1-2, like items are indicated by like reference numerals, and for brevity, descriptions of the structure, provided above with reference to the preceding figures, are not repeated. The methods described in FIG. 4 are described with reference to the exemplary structure described in FIGS. 1-2 and the data sketch in FIG. 3.

Referring to FIG. 1, an exemplary system 100 comprises one or more power converters 10, a plurality of battery packs 20, and a controller 60. The number of each component and the configuration in FIG. 1 are for illustration only. The system may have any suitable number of each component in any suitable combination or configuration.

Each power converter 10 is coupled with at least one of the plurality of battery packs 20, and is configured to convert direct current (DC) from a battery pack to alternating current (AC) or vice versa. The power converter 10 can be also called as power conversion system (PCS) or an inverter.

The controller 60 is coupled to the plurality of battery packs 20 and the one or more power converters 10. In some embodiments, the system may also include more than one controller 60, and each controller 60 is coupled to a plurality of battery packs 20.

The controller 60 may be coupled to the plurality of battery packs 20 directly or indirectly. For example, in some embodiments, the exemplary system 100 may optionally further comprise one or more battery power management unit (BPMU), which can be also called battery management unit (BMU). Each BPMU 30 may be connected with one or more battery packs 20, and is configured to monitor the one or more battery packs 20 and provide characteristic data of the one or more battery packs 20 to the controller 60. In some embodiments, the controller 60 is configured to read the data from each battery pack 20. This may be done through each respective BPMU 30 connected with each battery pack.

The plurality of battery packs 20 are heterogeneous battery packs, which can be selected from new batteries, second-use electric vehicle (EV) batteries, or combinations thereof. The plurality of battery packs 20 are connected in parallel, in series, or in a combination thereof. In some embodiments, the plurality of battery packs 20 are connected in parallel. No series connection between battery packs eliminates circulating currents and losses.

As shown in FIG. 1, the plurality of battery packs 20 are connected in a parallel configuration. In some embodiments, the plurality of battery packs 20 are second-use (i.e. used) electric vehicle (EV) batteries. The used EV batteries can be directly utilized in the system, without pre-selection or dismantling. Each battery pack 20 comprises a battery or batteries. Each battery packs 20 may include an internal battery management unit (BMU), and an internal inverter. EV battery packs 20 are removed from vehicles and are not disassembled into modules. Simple tests may be done on these EV battery packs 20 to verify their SOH.

In some embodiments, the exemplary system 100 is an electrical energy storage system. The controller 60 is configured to receive a total power demand provided from an upper level energy management system (EMS) 110. In some embodiments, the controller 60 is configured to discharge power from the plurality of battery packs 20 in direct current to a grid or load 85 in alternating current. The exemplary system 100 can be used for discharging power from battery packs 20 to a grid 85, or for charging from the grid 85 to battery packs 20. Wire connection 12 may be used. The dotted lines 13 in FIG. 1 illustrates alternative power cables. Multiple power cable topologies may exist between the converter 10 and battery packs 20. The system 100 directly uses grid tied AC/DC converters 10 with flexibility in size expansion. No additional power conversion system is required for grid tied applications.

In some embodiments, the grid 85 is optional. The power can be discharged to other components, in which electrical power is needed.

The controller 60 may be connected with other components in wire or wireless mode. In the exemplary system 100 illustrated in FIG. 1, the controller 60 may be connected with other components such as converter 10, BPMU 30 and EMS 110 via data cable or wireless connection 22. The BPMU 30 may be also connected with battery packs 20 via data cables or wireless connection 22. The controller 60 can work in a cloud-based mode.

Each battery pack 20 may be connected to a power converter 10 (or independent DC port on a converter 10) through a set of automatic DC circuit breakers (not shown), which activate and control the connection between a battery pack 20 and the converter 10. The converter 10 controls whether or not to charge or discharge the single EV battery pack 20 by following the instructions from the controller 60.

Referring to FIG. 2, the controller 60 comprises one or more processors 62 and at least one tangible, non-transitory machine readable medium encoded with one or more programs configured to perform steps for controlling a discharging process of the system having the plurality of battery packs. The controller 60, the processor 62, and/or the program 74 may be an external device to the converter 10, or be an internal device inside the converter 10.

The processor(s) 62 may include a central control 64, which includes a parameter input module 66, model module 68, a parameter control module 70, and information and instruction module 72. The parameter input module 66 coordinates with the battery packs 20, optionally BPMU 30 and HMI or EMS 110, to read the data from battery packs 20 and power demand from HMI or EMS 110. The parameter input module 66 also coordinates with each power converter 10. The parameter control module 70 coordinates with each power converter 10 and each battery pack 20, and optionally with BPMU 30 and HMI or EMS 110 to control a process of discharging. Together with the one or more programs 74, the model module 68 is configured to perform a simulation based on the input parameters to provide information and instruction to the parameter control module 70 and the information and instruction module 72. The processors 62 may be optionally connected with one or more displays 76 for displaying the information and instructions from module 72 and to an operator.

The controller 60 with the programs 74 and the processor 62 are configured to perform steps for discharging or charging as described herein. As described in FIG. 4, in some embodiments, the controller 60 is configured to perform the steps described herein. These steps include: receiving a total power demand (D) needed to be dispatched from the system 100 or to be charged to the system 100, and collecting characteristic data of each battery pack 20. The total power demand (D) is the total energy required in a unit time. The characteristic data of each battery pack 20 include at least a maximum voltage ($V_{i\ max}$) and a minimum voltage for discharge ($V_{i\ min}$), which can be derived from a curve (e.g., FIG. 3) of voltage versus charge of each battery pack 20. The characteristic data may also include a maximum total rated power ($d_{i\ max}$, in Kilowatts) and a present voltage ($V_i$). The characteristic data may also include capacity, state of health (SOH), and/or state of charge (SOC) and other parameters of each battery pack.

The steps further include determining a voltage distribution parameter ($V_i^*$) of each battery pack based on $V_{i\ max}$, $V_{i\ min}$, and $V_i$. The steps also include ranking the plurality of battery packs 20 by assigning a rank to each battery pack 20 as an order for discharging or charging based on the voltage distribution parameter ($V_i^*$) for each battery pack 20, and determining a respective power discharge or charge for each battery pack based on the rank of each battery pack and the total power demand (D). The number of battery packs is represent as "n." The subscript "i" represents battery packs from 1 to n.

In some embodiments, the controller 60 is configured to rank the plurality of battery packs 20 in an increasing order, a decreasing order, or a random order of the voltage distribution parameter ($V_i^*$) of each battery pack. The ranks are assigned as from "1" to "n," where n is the number of the total battery packs. Rank of "1," which is the highest rank, has the highest priority for discharging or charging. The power is discharged or charged in the increasing order, the decreasing order, or the random order of the voltage distribution parameter ($V_i^*$), respectively. The controller 60 is configured to determine the respective power discharge or charge for each battery 20 by assigning the respective power discharge or charge based on a respective maximum total rated power ($d_{i\ max}$) of each battery pack in the order for discharging or charging until the total power demand (D) is reached. After the total power demand is satisfied, other battery packs with lower ranks may not be assigned for discharging or charging, and the respective power discharge or charge is zero. When the respective power discharge or charge of a certain battery pack is zero, the specific battery pack is kept idle without discharging or charging. Sometimes a battery pack cannot be used to discharge because its voltage is the same as or below its minimum voltage for discharging (i.e., having a voltage collapse), the specific battery pack 20 is kept idle without discharging. Such a battery pack 20 may need to be charged first or replaced.

In some embodiments, the controller 60 is configured to provide the signal with instructions for a pre-determined time interval, and re-determine the respective power discharge or charge for each battery pack 20 after the time interval ends or when a voltage collapse occurs to a battery pack, by repeating the steps described above. The controller 60 may be configured to dynamically control discharging or charging of the plurality of battery packs 20 by updating the respective power discharge or charge of each battery pack instantaneously with time.

The present disclosure provides a controller 60 as described herein for controlling discharge of a system 100 comprising a plurality of battery packs 20. The controller 60 is configured to control discharge or charge of heterogeneous battery packs 20, for example, in an electrical energy storage system. The controller 60 is configured to discharge power from the plurality of battery packs 20 to a grid or load 85 or charge power to the plurality of battery packs 20.

The present disclosure also provides a method 200 for controlling discharge or charge of a system 100 comprising a plurality of battery packs 20 through a controller 60 therein as described herein.

Different battery packs, especially second life or used batteries or batteries that have different capacities and ratings, have varying voltage-charge characteristics. The controller 60 and the method 200 in the present disclosure biases the discharge to battery packs with lower or higher voltage distribution parameter (V*).

Figure 3:
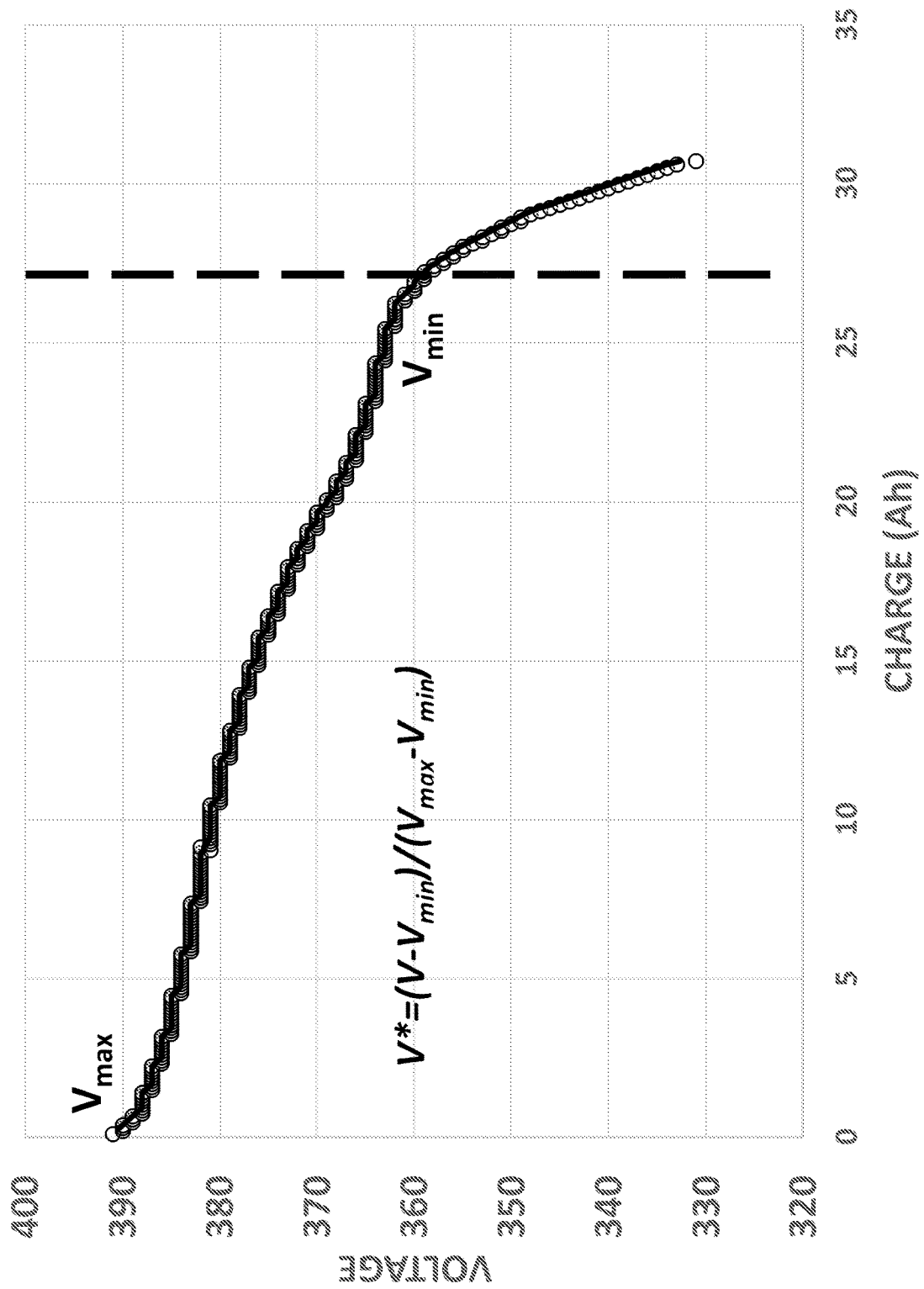
FIG. 3 shows the relationship between voltage (V) and charge flow (Ah) of an exemplary battery pack in some embodiments.
Figure 4:
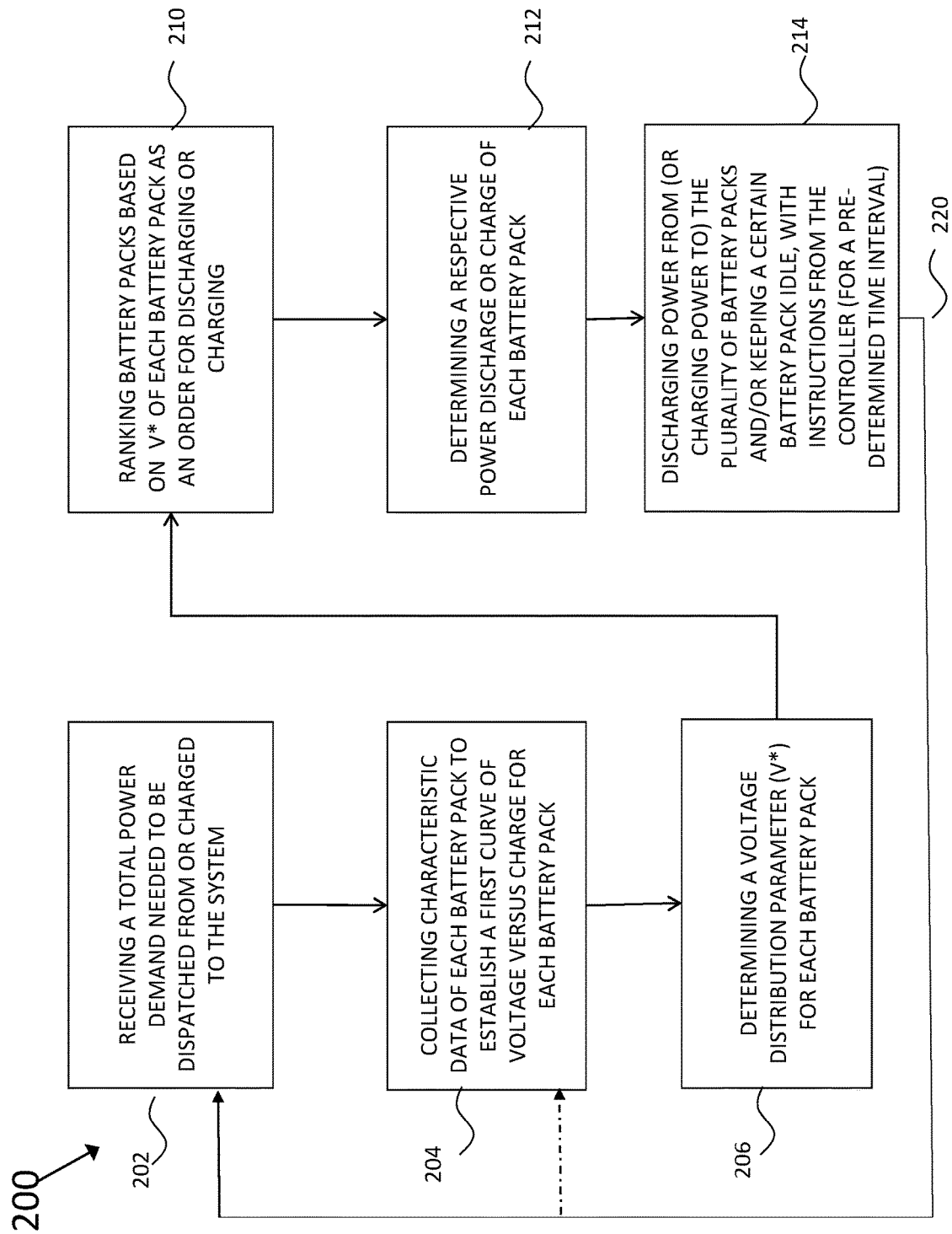
FIG. 4 is a flow chart illustrating an exemplary method for controlling discharge or charge of battery packs in accordance with some embodiments.

Referring to FIG. 3, an exemplary curve of voltage with charge flow of an exemplary battery pack 20 during a discharging process is shown. The input parameter may include voltage, current and time. Charge or charge flow (Q) is calculated from the current flow and the time elapsed. The voltage has a unit of volt (v), and the charge flow has a unit of Amp* hour (Ah) or coulomb. As shown in FIG. 3, Vmax is the voltage of such a battery pack when it is fully charged or it is at its maximum allowable charge level. Vmin is the voltage of such a battery pack when it is depleted of charge or it reaches its minimum allowable charge level.

The curve of voltage versus charge can be empirically generated at constant level of discharge while monitoring the current flow over the discharge period until the voltage drops beyond a user-defined minimum limit (Vmin), shown by the vertical dotted line in FIG. 3. The current and the voltage follow the same or similar trend with increase in charging time. In some embodiments, the curves of voltage versus charge are empirically generated at constant level of discharge while monitoring the current flow over the discharge period until the voltage drops beyond a user-defined minimum limit, shown by the intersection of the dotted vertical line with horizontal line from the y-axis.

Different discharge rates may yield different voltage discharge curves for the same battery packs. A family of curves at different discharge rates can be provided for each respective battery pack 20, and can be used to track the voltage trajectory of the packs for a given dispatch episode. In some embodiments, a technique such as extrapolation, interpolation, or averaging is used to get a representative curve. In one curve, when the voltage decreases beyond Vmin during discharge, such a battery pack shows a significantly higher voltage gradient and depletes more quickly. This lower limit point can be also referred as voltage collapse. In some embodiments, Vmax and Vmin are open circuit voltage specified by manufacturer or derived from pre-determined voltage-charge curves. The range of from Vmin to Vmax may be in a range of from 400 volts to 1,000 volts.

A voltage distribution parameter V* of a battery pack 20 having a present voltage (V) is defined as (V−Vmin)/(Vmax−Vmin). The higher the parameter, the higher degree this battery pack is capable of for further discharge. For example, exemplary battery packs used have V* in a range of from 50% to 95% in some embodiments.

FIG. 4 illustrates an exemplary method 200 for controlling or managing discharge or charge of a plurality of battery packs 20 in a system 100 in accordance with some embodiments. The plurality of battery packs 20 are heterogeneous battery packs selected from new batteries, second-use electric vehicle (EV) batteries, or combinations thereof. The plurality of battery packs 20 are connected in parallel, in series, or in a combination thereof. The plurality of battery packs 20 are connected preferably in parallel.

Referring to FIG. 4, at step 202, a total power demand needed to be dispatched from or to be charged to the system 100 is received by the controller 60. As described herein, a total power demand may be received from EMS 110.

At step 204, characteristic data of each battery pack 20 is collected. A curve of voltage versus charge for each battery pack 20 may be established. The voltage and charge in this curve may be referred as the first set or initial values. An exemplary curve is shown in FIG. 3 as described above. The voltage versus charge (amp-hr) characteristics of each battery pack may be empirically obtained or derived for a set of frequently encountered discharge rates. This provides a family of curves that can be used to track the voltage trajectory of the packs for a given dispatch episode. The characteristic data of each battery pack includes a maximum voltage ($V_{i\,max}$), a minimum voltage for discharge ($V_{i\,min}$), and a present voltage ($V_i$). The data may include a maximum total rated power ($d_{i\,max}$), SOH, and SOC of each battery pack 20.

The minimum and maximum voltage of each battery pack can be calculated according to the number of the cells in the respective pack and the configuration, in which the cells are arranged. For example, if maximum and minimum voltages of each cell are 4.2V and 3.5V, respectively, and a battery pack includes 144 cells, Vmax for the pack is 4.2×144 V and Vmin for such a battery pack is 3.5×144 V.

At step 206, a voltage distribution parameter ($V_i^*$) of each battery pack is determined based on respective $V_{i\,max}$, $V_{i\,min}$, and $V_i$. In some embodiments, V* is determined by using the voltage distribution parameter ($V_i^*$) of each battery pack is determined using Equation (1):

$$V_i^* = (V_i - V_{i\,min})/(V_{i\,max} - V_{i\,min}) \tag{1}$$

At step 210, the plurality of battery packs 20 are ranked by assigning a respective rank to each battery pack as an order for discharging or charging based on the voltage distribution parameter ($V_i^*$) for each battery pack.

At step 212, a respective power discharge or charge for each battery pack is determined based on the rank of each battery pack and the total power demand (D). The ranks for priority or order of discharge or charge are assigned as from 1, 2, 3, to n, which is the number of the battery packs 20 in the system. The rank for "1," which is considered as the highest rank, means that the corresponding battery packs are used to satisfy the total power demand (D) first.

In some embodiments, the plurality of battery packs 20 are ranked in an increasing order of the voltage distribution parameter ($V_i^*$) of each battery pack. The battery pack having the lowest V* is assigned to be "1." In some other embodiments, the plurality of battery packs 20 are ranked in a decreasing order of the voltage distribution parameter ($V_i^*$) of each battery pack 20. The battery pack having the highest V* is assigned to be "1." Alternatively, the plurality of battery packs 20 are ranked in a random order of the voltage distribution parameter ($V_i^*$) of each battery pack 20. In each scenario, the respective power discharge or charge for each battery is determined by assigning the respective power discharge or charge based on its capacity, for example, a respective maximum total rated power ($d_{i\,max}$) and/or state of charge, of each battery pack in the order for discharging or charging (from rank 1) until the total power demand (D) is reached. The respective power discharge or charge for other battery packs might be zero if the total power demand is satisfied by some, but not all, of the battery packs. A certain battery pack is kept idle when the respective power discharge or charge is assigned to zero.

In some embodiments, the capacity of all the battery packs E (in kWh) and the design charge power of the system Pd (in kW) are known. The duration Td (in hrs) of the system can be calculated by Equation Td=E/Pd. A maximum total rated power ($d_{i\,max}$, in kW) can be calculated by dividing the capacity of an individual batter pack by the duration. Such calculations can be also performed for discharging or charging.

For the purpose of illustration only, three embodiments are described below for steps 210 and 212.

First Embodiment

The plurality of battery packs 20 are ranked in an increasing order of the voltage distribution parameter ($V_i^*$) of each battery pack. The battery pack having the lowest V* is assigned to be "1" (i.e. the highest priority for discharging or charging), while the battery pack having the highest V* is assigned to be "n" (the total number of the battery packs). The power demand (D) or called the total dispatch power (Dd) needed as required by the EMS is provided to the system in a time interval, for example, in 15-minute increments. The respective power discharge (ddi) of each battery pack is determined according to the rank from "1" with ddi=ddimax until Sum (ddi)=Dd. The maximum total rated power is represented in "ddimax." The respective power discharge (ddi) may be limited by the maximum capability for discharging (or charging), and may also be determined based on from the respective power discharge (ddi) and the state of charge (SOC). If some of the battery packs can discharge power to satisfy the total power demand (Dd), other battery packs left have a respective power discharge being zero (i.e. ddi=0).

In the present disclosure, in the parameters "D," "Dd," and "Dc," which may be used interchangeably, the letters "d" and "c" are used to represent "discharge" and "charge," respectively. Similarly, the parameters "ddi" and "dci," which is interchangeable with "di." The power discharge may have an absolute value higher than zero in a unit such as kWh, but power discharge is represented in negative values while the power charge is represented in positive values.

When the EMS provides signal that power is available for charging Dc, the ranking process may be performed if needed. The ranks may be the same as described above. A respective power charge (dci) is determined according to first selecting packs where Vi<Vimax and then rank according to V* with rank "1" assigned to the battery pack having lowest V* as described above. The respective power charge (dci) is determined according to the rank with dci=dcimax until Sum (dci)=Dc. The battery packs having the lowest V* will be assigned for 100% charge first and then moves to the next lowest V* until Sum (dci)=Dc. If needed, other battery packs may be assigned to have zero charge (i.e. dci=zero).

The method in the first embodiment provides advantages additional to those described herein. For example, the battery packs having lower V*, which are weaker packs, can be used and exhausted first to extend the life of the stronger packs. After repeated uses, these weak packs may not be workable, and are replaced. A more healthy system can be established.

Second Embodiment

The plurality of battery packs 20 are ranked in a decreasing order of the voltage distribution parameter ($V_i^*$) of each battery pack. The battery pack having the highest V* is assigned to be "1" while the battery pack having the lowest V* is assigned to be "n." The power demand (D) or called the total dispatch power (Dd) needed as required by the EMS is provided to the system in a time interval, for example, in 15-minute increments. The respective power discharge (ddi) of each battery pack is determined according to the rank from "1" with ddi=ddimax until Sum (ddi)=Dd. The maximum total rated power is represented in "ddimax." The respective power discharge (ddi) may be limited by the maximum capability for discharging (or charging), and may be also determined based on from the respective power discharge (ddi) and/or the state of charge (SOC). If some of the battery packs can discharge power to satisfy the total power demand (Dd), other battery packs have a respective power discharge is zero (i.e. ddi=0).

When the EMS provides signal that power is available for charging Dc, the ranking process may be performed if needed. The ranks may be the same as those before the discharging process as described above. A respective power charge (dci) is determined according to first selecting packs where Vi<Vimax and then rank according to V* with rank "1" assigned to the battery pack having highest V* as described above. The respective power charge (dci) is determined according to the rank with dci=dcimax until Sum (dci)=Dc. The battery packs having the highest V* will be assigned for 100% charge first and then moves to the next highest V* until Sum (dci)=Dc. If needed, other battery packs may be assigned to have zero charge (i.e. dci=zero).

The method in the second embodiment provides advantages additional to those described herein. For example, the battery packs having highest V*, which are stronger packs, can be used first to extend the life of the weaker packs and the whole system, especially when the replacement of weaker battery packs may not be available.

Third Embodiment

The plurality of battery packs 20 are ranked in a random order of the voltage distribution parameter ($V_i^*$) of each battery pack. A random program can be used to randomly choose a value of V* from the dataset and select a corresponding battery pack. Similarly, all the battery packs are randomly assigned a rank from "1" to "n." The power demand (D) or called the total dispatch power (Dd) needed as required by the EMS is provided to the system in a time interval, for example, in 15-minute increments. The respective power discharge (ddi) of each battery pack is determined according to the rank from "1" with ddi=ddimax until Sum (ddi)=Dd. The maximum total rated power is represented in "ddimax." The respective power discharge (ddi) may be limited by the maximum capability for discharging (or charging), and may be also determined based on from the respective power discharge (ddi) and the state of charge (SOC). If some of the battery packs can discharge power to satisfy the total power demand (Dd), other battery packs have a respective power discharge is zero (i.e. ddi=0).

When the EMS provides signal that power is available for charging Dc, the battery packs may be randomly ranked again. A respective power charge (dci) is determined according to first selecting packs where Vi<Vimax and then rank according to V* with rank "1" assigned to the battery pack. The respective power charge (dci) is determined according to the rank with dci=dcimax until Sum (dci)=Dc. The battery packs having the ranks from 1 will be assigned for 100% charge first and then moves to the next rank (e.g., 2, 3 to n) until Sum (dci)=Dc. If needed, other battery packs may be assigned to have zero charge (i.e. dci=zero).

The method in the third embodiment provides advantages additional to those described herein. For example, the battery packs having different V* are randomly used. The randomization in ranking ensures that the battery packs are uniformly used over a period of time even though a subset of packs are used at a particular moment to satisfy the dispatch requirement from the EMS. Such a method extends the life of all the packs and the whole system. This approach is useful when the battery packs in a system are relatively good and uniform.

Overall, the methods provided in the present disclosure utilize a series of heterogeneous battery packs to provide a consistent and long-lasting dispatch profile according to a ranking process based on V* to satisfy the dispatch requirement for discharging or charging from the EMS. The managed throughput leads to improved life and performance for an energy storage system.

Referring back to FIG. 4, at step 214, signals with instructions are provided from the controller 60 to the plurality of battery packs 20 and the one or more power converters 10 for discharging power from, or charging power to, the plurality of battery packs 20 based on the respective power discharge or charge of each battery pack. A certain battery pack is kept idle if the respective power is zero.

Power from the plurality of battery packs 20 is discharged or the power will be charged to the battery packs 20 according to the instructions. After each process, for each battery pack, an alternate curve of voltage versus charge might be generated and used to generate the voltage distribution parameter at step 206. Sometimes the curves may be the same.

Discharge energy is assumed to be delivered in unit time. Therefore, energy is synonymous with power for dispatch purposes.

Referring to FIG. 4, in some embodiments, the method 200 further comprises a re-assigning (or re-determining) step or cycle 220. At step 214, the controller 60 provides the signal with instructions for a pre-determined time interval. The interval can be defined by a user. For example, the time interval may be any time length from 10 second to 2 hours, for example, 1 minute, 2 minutes, 5 minutes, 10 minutes, 15 minutes, 30 minutes, or one hour. After step 220, the controller re-assigns power discharge or charge for the plurality of battery packs after the time interval ends or when a voltage collapse occurs to a battery pack, by repeating some or all of the steps including steps 202, 204, 206, 210, 212, and 214. In some embodiments, the re-assignment process goes back to and starts from step 202. In some embodiments, the re-assignment process goes back to and starts from step 204. The discharging process of the plurality of battery packs can also be dynamically controlled by updating the respective power discharge or charge of each battery pack instantaneously with time. The time interval can be very short or minimal.

In some embodiments, the system 100 includes a heterogeneous battery packs 20 integrated with bidirectional converter (or inverter) 10 connected to the grid or microgrid 85 that can be dispatched remotely or locally using this intelligent algorithm running in local or cloud-based controller 60. In some embodiments, the algorithm requires prior knowledge of the voltage-charge curves, which can be acquired during commissioning and subsequently updated as the battery packs age or wear out due to use/disuse.

The system, the controller, and the method provided in the present disclosure offer many advantages. For example, a variety of battery packs such as used EV battery packs having different quality can be used. No pre-selection or dismantle of the battery packs are needed. The system, the controller, and the method extend the life of some or all battery packs, and they also offer flexibility in maintaining and upgrading the system as well.

EXAMPLES

For illustration only, an exemplary energy storage system having four battery packs is used. The four battery packs are connected in parallel, and each of them is connected with a single converter. FIGS. 5-9 illustrate the data from the comparative examples while FIGS. 10-14 illustrate the data from the experimental examples following the method of the first embodiment as described above.

The battery packs can discharge maximum at 0.5 C and charged at 0.5 C. The C rating of 0.5 C means that the battery usable capacity of a battery pack is used (charged or discharged) in two hours. There capacities and voltage characteristics are different, so their recommended/allowable maximum charge and discharge rates are different. It is assumed that maximum total rated power for battery packs 1, 2, 3, and 4 is 3.16 kW, 6.66 kW, 6.95 kW, 7.71 kW, respectively. The maximum total power is based on the C rating. For example, if the C rating is 0.5 C according to the specification, a 10 kWh battery has a maximum power of 5 kW. The actual power charged or discharged from a battery pack is different from its maximum power, and is determined according to the method described herein.

It is also assumed that when the battery packs are at 100% SOC, the voltage distribution parameter ($V^*$) of each pack is also in the same order from the lowest to the highest as the maximum power from each pack from the lowest to the highest. In FIGS. 10-14, the order of $V^*$ for battery packs is in an increasing order from Pack 1, Pack 2, Pack 3, to Pack 4 (with the highest $V^*$). The capacity (Dimax) for Pack 1, Pack 2, Pack 3, to Pack 4 is 6.32, 13.32, 13.90, and 15.42 kWh, respectively.

Figure 5:
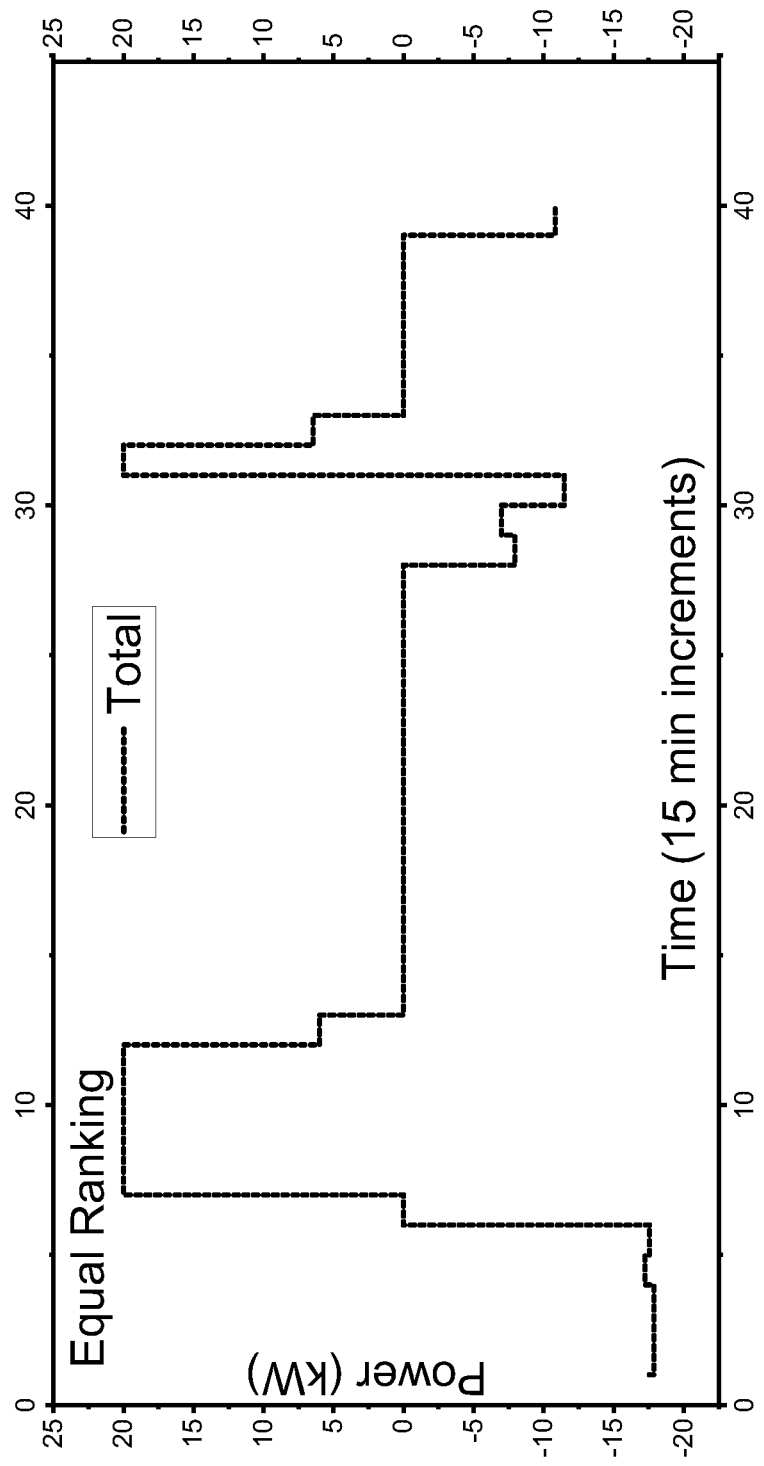
FIG. 5 illustrates the total power demand or dispatch needed from an exemplary system including four battery packs (Packs 1, 2, 3, and 4) at different time intervals (each with 15 minutes), when each battery pack is equally ranked, thus equally discharged.
Figure 6:
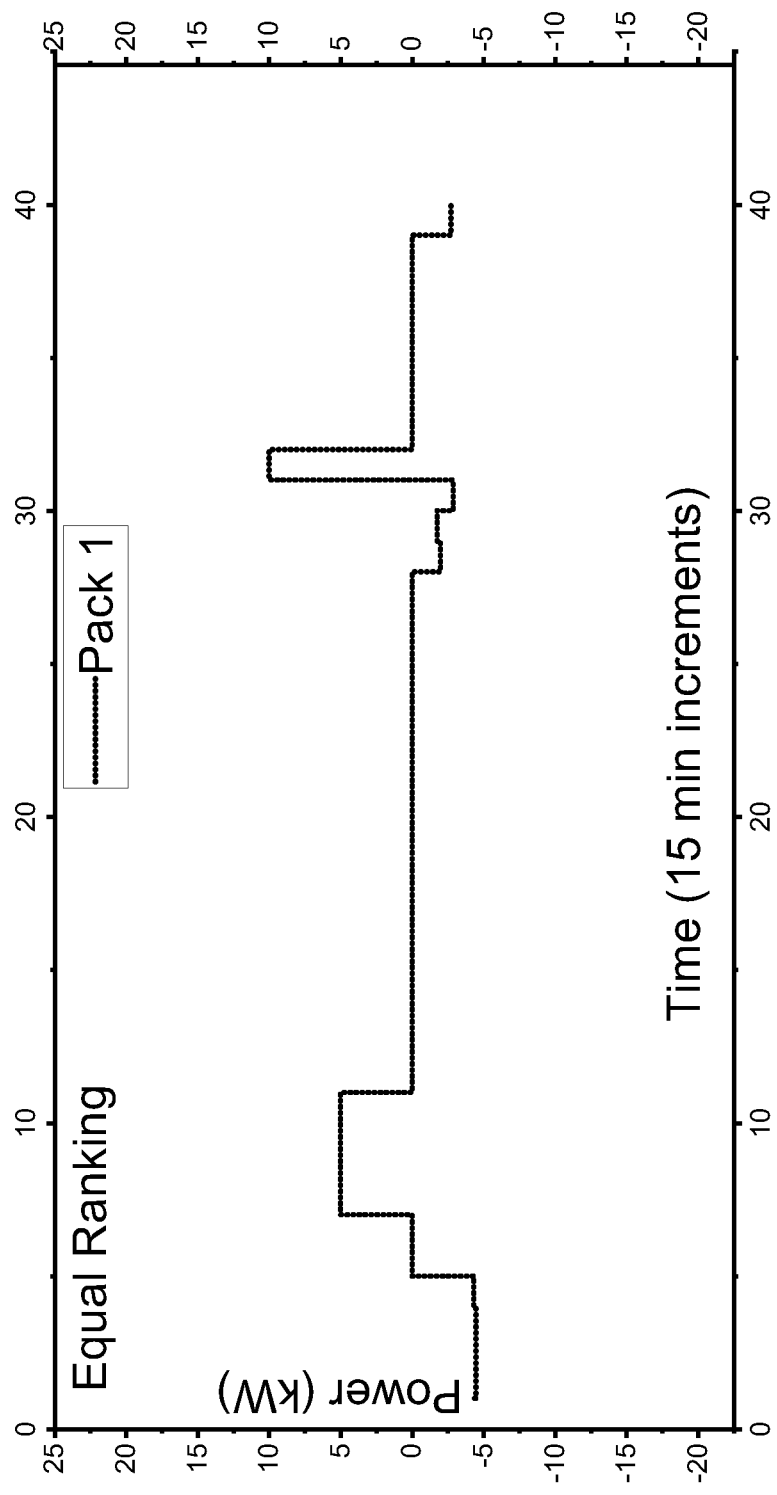
FIGS. 6-9 illustrate the respective power discharge from each battery pack (Packs 1, 2, 3, and 4, respectively) to meet the total power demand as shown in FIG. 5.
Figure 7:
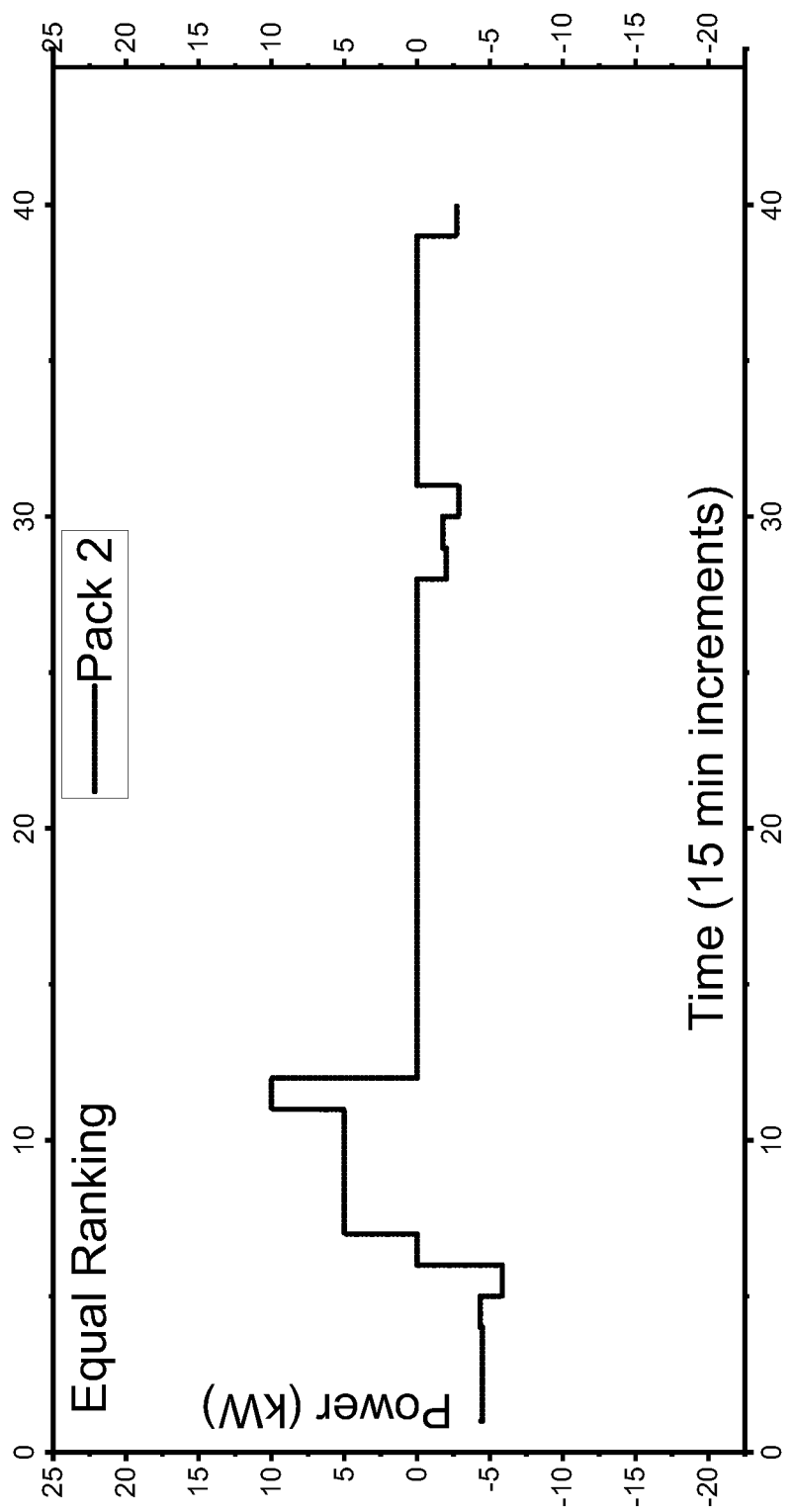
Figure 8:
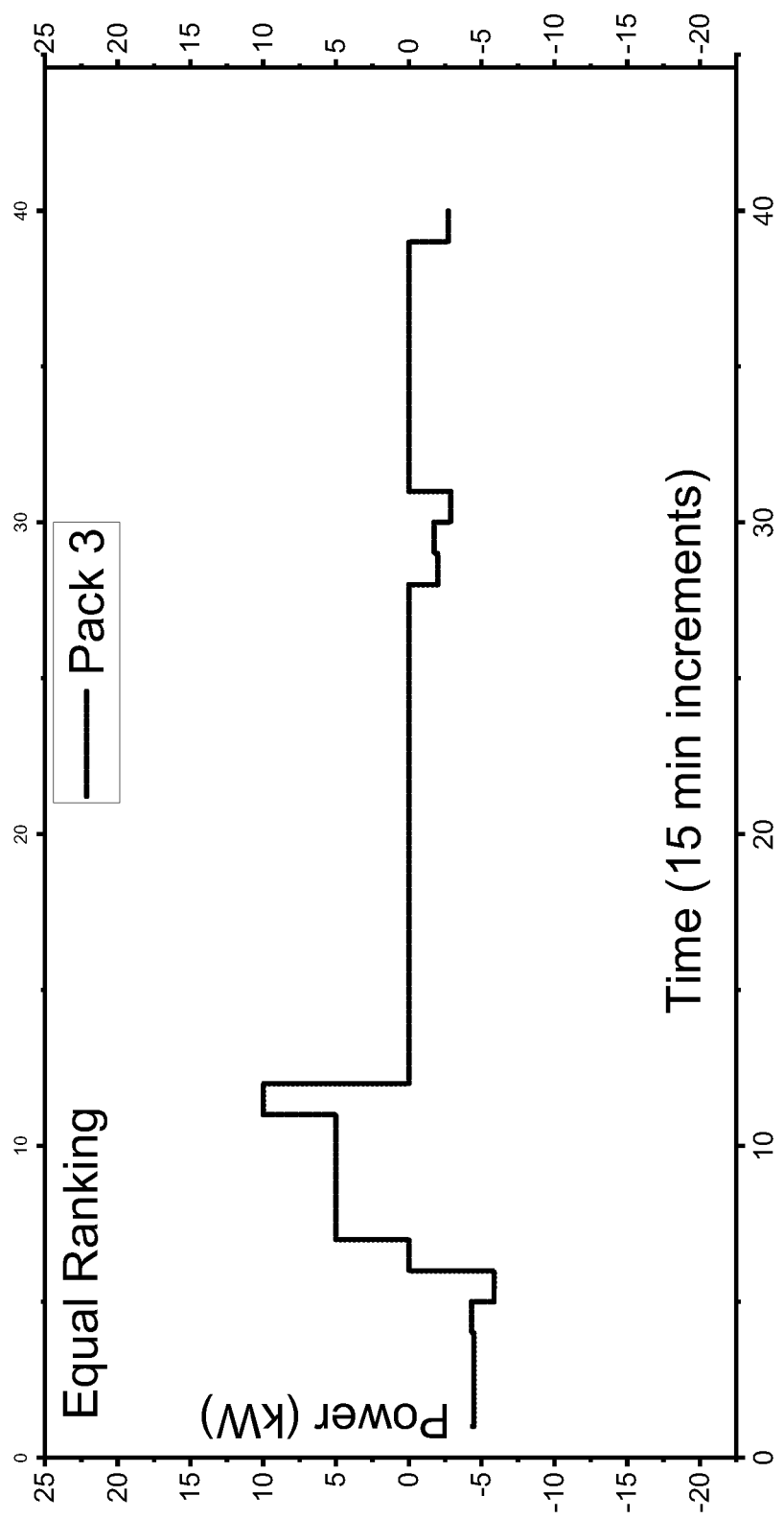

An exemplary profile of the total power demand or dispatch (D) needed from an exemplary system at different time intervals (each with 15 minutes) is shown in Table 1 and illustrated in FIG. 5. Each battery pack is equally ranked, thus equally discharged or charged.

TABLE 1

Total power demand (D) for the system in 40 15-minute time intervals

| Interval (15 minutes) | Total Power Dispatch (kW) | Interval (15 minutes) | Total Power Dispatch (kW) |
|---|---|---|---|
| 1 | −17.56 | 21 | 0 |
| 2 | −17.88 | 22 | 0 |
| 3 | −17.88 | 23 | 0 |
| 4 | −17.88 | 24 | 0 |
| 5 | −17.24 | 25 | 0 |
| 6 | −17.56 | 26 | 0 |
| 7 | 0 | 27 | 0 |
| 8 | 20 | 28 | 0 |
| 9 | 20 | 29 | −7.96 |
| 10 | 20 | 30 | −7 |
| 11 | 20 | 31 | −11.48 |
| 12 | 20 | 32 | 20 |
| 13 | 6 | 33 | 6.44 |
| 14 | 0 | 34 | 0 |
| 15 | 0 | 35 | 0 |
| 16 | 0 | 36 | 0 |
| 17 | 0 | 37 | 0 |
| 18 | 0 | 38 | 0 |
| 19 | 0 | 39 | 0 |
| 20 | 0 | 40 | −10.84 |

As shown in Table 1, the total power demand (D) is negative for discharging and positive for charging, and is divided among the four packs by the controller 60. In the comparative example, the total power demand is equally divided among the four battery packs.

Table 2 and FIGS. 6-9 illustrate the respective power discharge from each battery pack (Packs 1, 2, 3, and 4, respectively) to meet the total power demand as shown in Table 1 and FIG. 5.

TABLE 2

Respective power discharge or charge for each battery pack in the comparative example

| Interval (15 minutes) | Pack 1 | Pack 2 | Pack 3 | Pack 4 |
|---|---|---|---|---|
| 1 | −4.39 | −4.39 | −4.39 | −4.39 |
| 2 | −4.47 | −4.47 | −4.47 | −4.47 |
| 3 | −4.47 | −4.47 | −4.47 | −4.47 |
| 4 | −4.47 | −4.47 | −4.47 | −4.47 |
| 5 | −4.31 | −4.31 | −4.31 | −4.31 |
| 6 | 0.00 | −5.85 | −5.85 | −5.85 |
| 7 | 0.00 | 0.00 | 0.00 | 0.00 |
| 8 | 5.00 | 5.00 | 5.00 | 5.00 |

TABLE 2-continued

Respective power discharge or charge for each battery pack in the comparative example

| Interval (15 minutes) | Pack 1 | Pack 2 | Pack 3 | Pack 4 |
|---|---|---|---|---|
| 9 | 5.00 | 5.00 | 5.00 | 5.00 |
| 10 | 5.00 | 5.00 | 5.00 | 5.00 |
| 11 | 5.00 | 5.00 | 5.00 | 5.00 |
| 12 | 0.00 | 10.00 | 10.00 | 0.00 |
| 13 | 0.00 | 0.00 | 0.00 | 0.00 |
| 14 | 0.00 | 0.00 | 0.00 | 0.00 |
| 15 | 0.00 | 0.00 | 0.00 | 0.00 |
| 16 | 0.00 | 0.00 | 0.00 | 0.00 |
| 17 | 0.00 | 0.00 | 0.00 | 0.00 |
| 18 | 0.00 | 0.00 | 0.00 | 0.00 |
| 19 | 0.00 | 0.00 | 0.00 | 0.00 |
| 20 | 0.00 | 0.00 | 0.00 | 0.00 |
| 21 | 0.00 | 0.00 | 0.00 | 0.00 |
| 22 | 0.00 | 0.00 | 0.00 | 0.00 |
| 23 | 0.00 | 0.00 | 0.00 | 0.00 |
| 24 | 0.00 | 0.00 | 0.00 | 0.00 |
| 25 | 0.00 | 0.00 | 0.00 | 0.00 |
| 26 | 0.00 | 0.00 | 0.00 | 0.00 |
| 27 | 0.00 | 0.00 | 0.00 | 0.00 |
| 28 | 0.00 | 0.00 | 0.00 | 0.00 |
| 29 | −1.99 | −1.99 | −1.99 | −1.99 |
| 30 | −1.75 | −1.75 | −1.75 | −1.75 |
| 31 | −2.87 | −2.87 | −2.87 | −2.87 |
| 32 | 10.00 | 0.00 | 0.00 | 10.00 |
| 33 | 0.00 | 0.00 | 0.00 | 0.00 |
| 34 | 0.00 | 0.00 | 0.00 | 0.00 |
| 35 | 0.00 | 0.00 | 0.00 | 0.00 |
| 36 | 0.00 | 0.00 | 0.00 | 0.00 |
| 37 | 0.00 | 0.00 | 0.00 | 0.00 |
| 38 | 0.00 | 0.00 | 0.00 | 0.00 |
| 39 | 0.00 | 0.00 | 0.00 | 0.00 |
| 40 | −2.71 | −2.71 | −2.71 | −2.71 |

As shown in Table 2 and FIGS. 6-9, the four battery packs are individually dispatched at equal power in general. In scenarios where one or more pack(s) have reached their SOC of 0 or 100%, they rebalance to adjust power between each other. At every moment the power dispatched from all packs are equal, except the ones that have reached a zero power status. For example, in each of the 12th and 32th intervals, two battery packs have SOC or capacity reaching zero.

Figure 10:
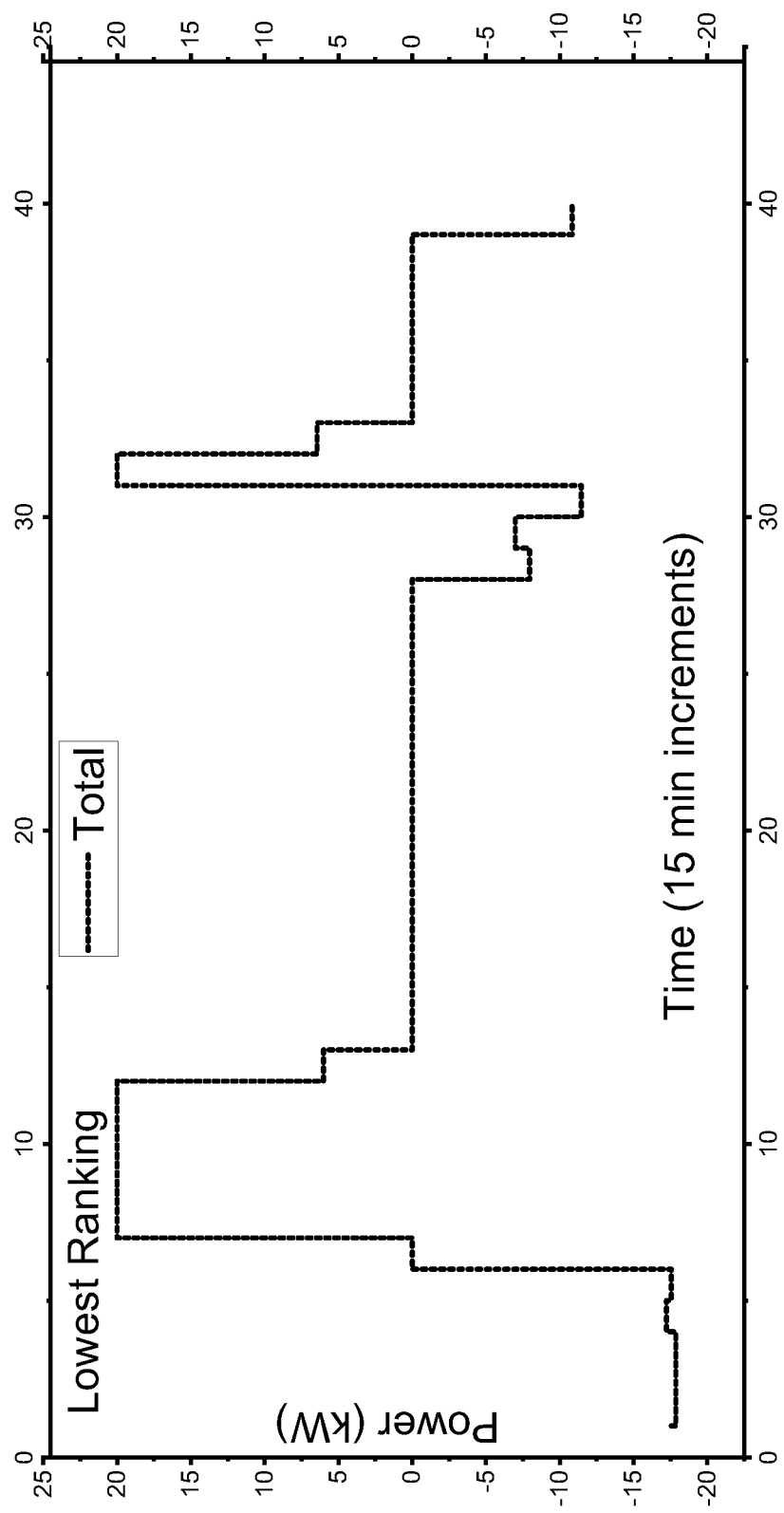
FIG. 10 illustrates the total power demand or dispatch needed from an exemplary system including four battery packs (Packs 1, 2, 3, and 4) at different time intervals (each with 15 minutes), when the battery packs are ranked in an increasing order of the voltage distribution parameter (V*) as the order of discharge and a battery pack having the lowest V* discharges first.
Figure 11:
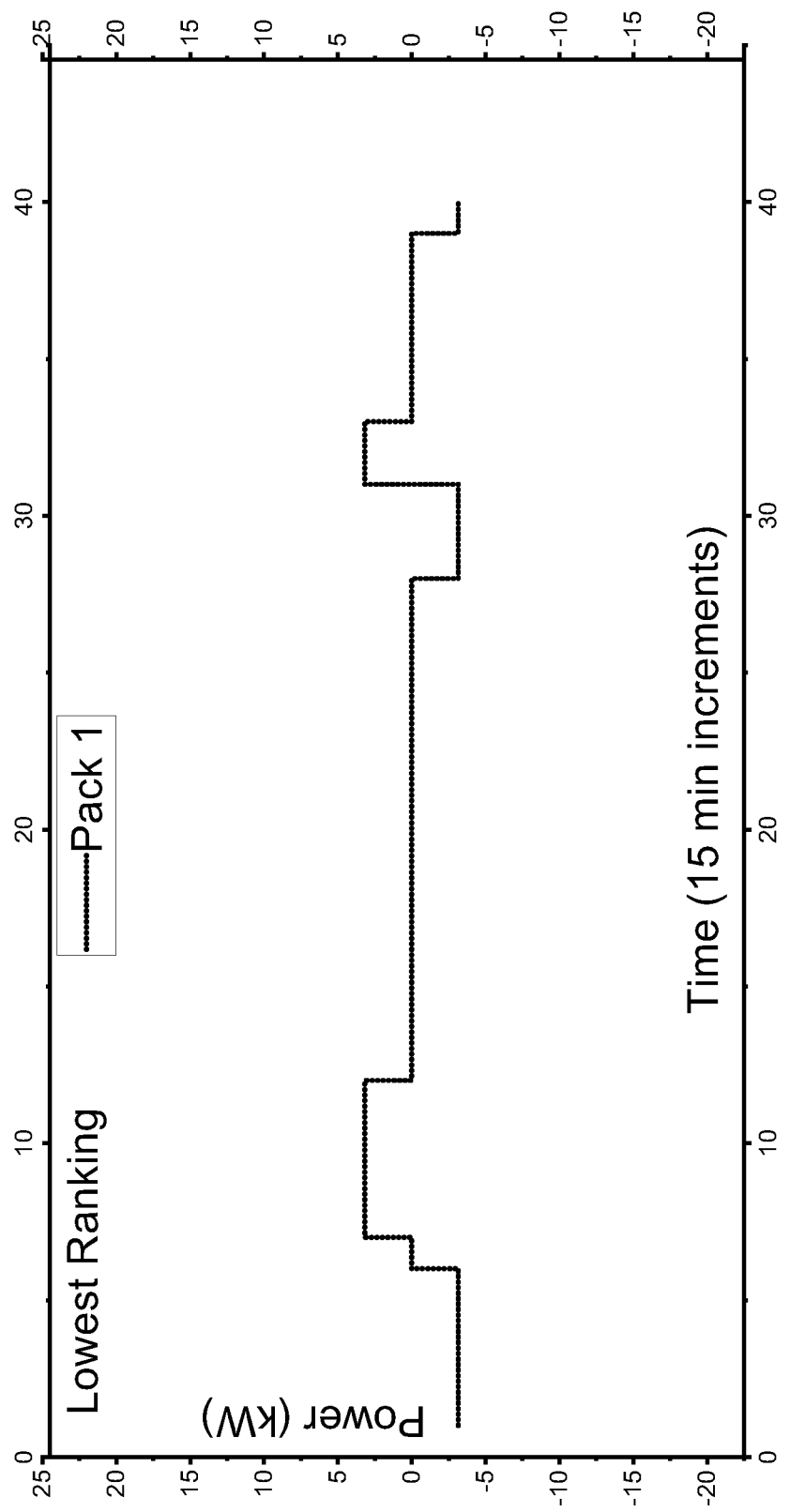
FIGS. 11-14 illustrate the respective power discharge from each battery pack (Packs 1, 2, 3, and 4, respectively) to meet the total power demand as shown in FIG. 10.
Figure 12:
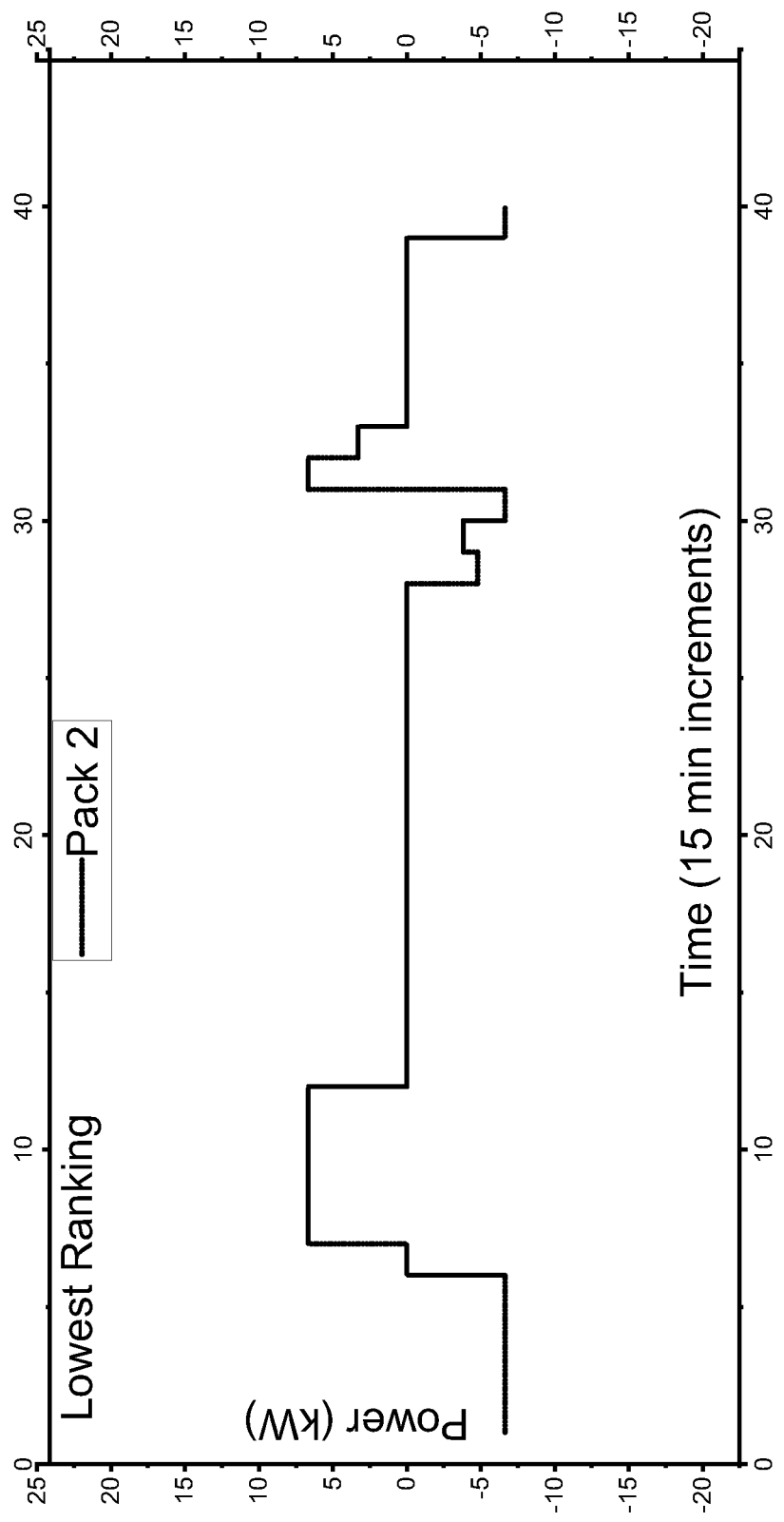
Figure 13:
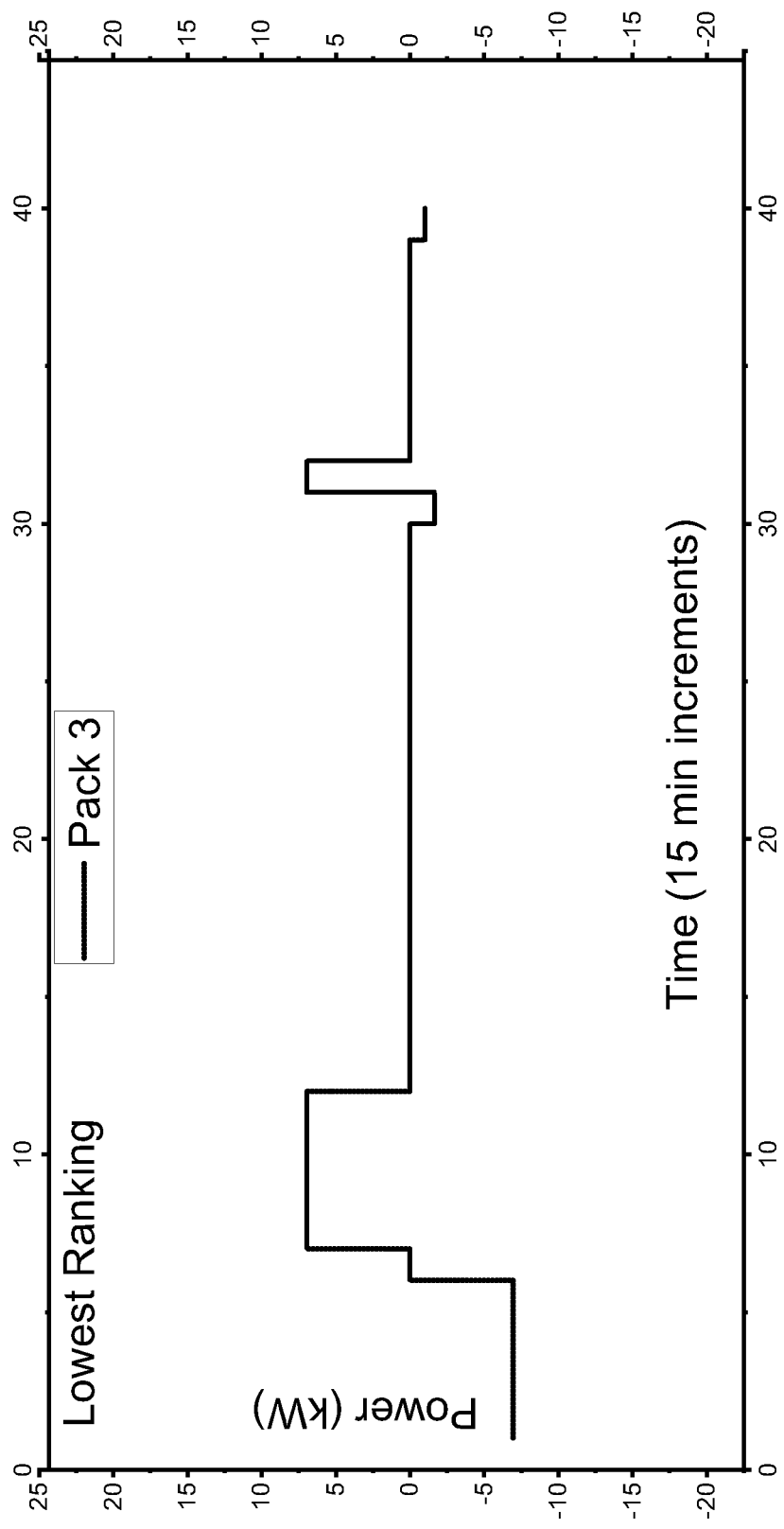

FIG. 10 illustrates the total power demand or dispatch needed from an exemplary system including four battery packs (Packs 1, 2, 3, and 4) at different time intervals (each with 15 minutes) for the experimental example. The battery packs are ranked in an increasing order of the voltage distribution parameter (V*) as the order of discharge and a battery pack having the lowest V* discharges first. The data in FIG. 10 are the same as that in FIG. 5 and in Table 1.

As described above, it is also assumed that when the packs are at 100% SOC, the voltage of each pack is also in the same order from the lowest to the highest V as the maximum power from each pack from the lowest to the highest. For simplicity, it is also assumed that the order of the voltage from the lowest to highest remains the same after every 15 minute increment when a new rank order is established.

Table 3 and FIGS. 11-14 illustrate the respective power discharge from each battery pack (Packs 1, 2, 3, and 4, respectively) to meet the total power demand as shown in FIG. 10.

TABLE 3

Respective power discharge or charge for each battery packs in the Experimental Example

| Interval (15 minutes) | Pack 1 | Pack 2 | Pack 3 | Pack 4 |
|---|---|---|---|---|
| 1 | −3.16 | −6.66 | −6.95 | −0.79 |
| 2 | −3.16 | −6.66 | −6.95 | −1.11 |
| 3 | −3.16 | −6.66 | −6.95 | −1.11 |
| 4 | −3.16 | −6.66 | −6.95 | −1.11 |
| 5 | −3.16 | −6.66 | −6.95 | −0.47 |
| 6 | −3.16 | −6.66 | −6.95 | −0.79 |
| 7 | 0.00 | 0.00 | 0.00 | 0.00 |
| 8 | 3.16 | 6.66 | 6.95 | 0.00 |
| 9 | 3.16 | 6.66 | 6.95 | 0.00 |
| 10 | 3.16 | 6.66 | 6.95 | 0.00 |
| 11 | 3.16 | 6.66 | 6.95 | 0.00 |
| 12 | 3.16 | 6.66 | 6.95 | 0.00 |
| 13 | 0.00 | 0.00 | 0.00 | 0.00 |
| 14 | 0.00 | 0.00 | 0.00 | 0.00 |
| 15 | 0.00 | 0.00 | 0.00 | 0.00 |
| 16 | 0.00 | 0.00 | 0.00 | 0.00 |
| 17 | 0.00 | 0.00 | 0.00 | 0.00 |
| 18 | 0.00 | 0.00 | 0.00 | 0.00 |
| 19 | 0.00 | 0.00 | 0.00 | 0.00 |
| 20 | 0.00 | 0.00 | 0.00 | 0.00 |
| 21 | 0.00 | 0.00 | 0.00 | 0.00 |
| 22 | 0.00 | 0.00 | 0.00 | 0.00 |
| 23 | 0.00 | 0.00 | 0.00 | 0.00 |
| 24 | 0.00 | 0.00 | 0.00 | 0.00 |
| 25 | 0.00 | 0.00 | 0.00 | 0.00 |
| 26 | 0.00 | 0.00 | 0.00 | 0.00 |
| 27 | 0.00 | 0.00 | 0.00 | 0.00 |
| 28 | 0.00 | 0.00 | 0.00 | 0.00 |
| 29 | −3.16 | −4.80 | 0.00 | 0.00 |
| 30 | −3.16 | −3.84 | 0.00 | 0.00 |
| 31 | −3.16 | −6.66 | −1.66 | 0.00 |
| 32 | 3.16 | 6.66 | 6.95 | 0.00 |
| 33 | 3.16 | 3.28 | 0.00 | 0.00 |
| 34 | 0.00 | 0.00 | 0.00 | 0.00 |
| 35 | 0.00 | 0.00 | 0.00 | 0.00 |
| 36 | 0.00 | 0.00 | 0.00 | 0.00 |
| 37 | 0.00 | 0.00 | 0.00 | 0.00 |
| 38 | 0.00 | 0.00 | 0.00 | 0.00 |
| 39 | 0.00 | 0.00 | 0.00 | 0.00 |
| 40 | −3.16 | −6.66 | −1.02 | 0.00 |

As shown in Table 3 and FIGS. 11-14, the battery packs are individually dispatched at different powers. In scenarios where one or more pack(s) have reached their SOC of 0 or 100%, they rebalance to adjust powers among the packs.

Figure 9:
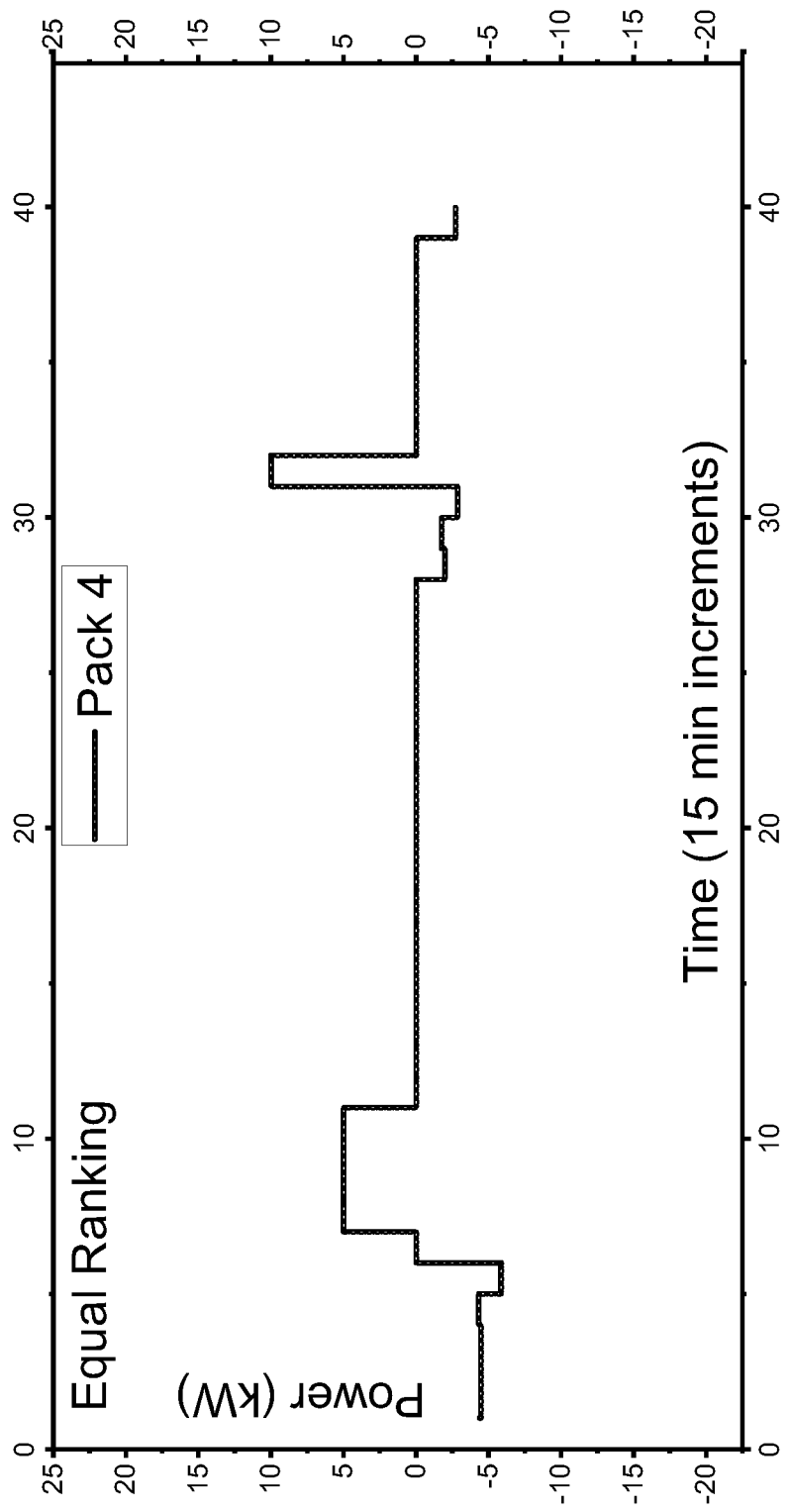
Figure 14:
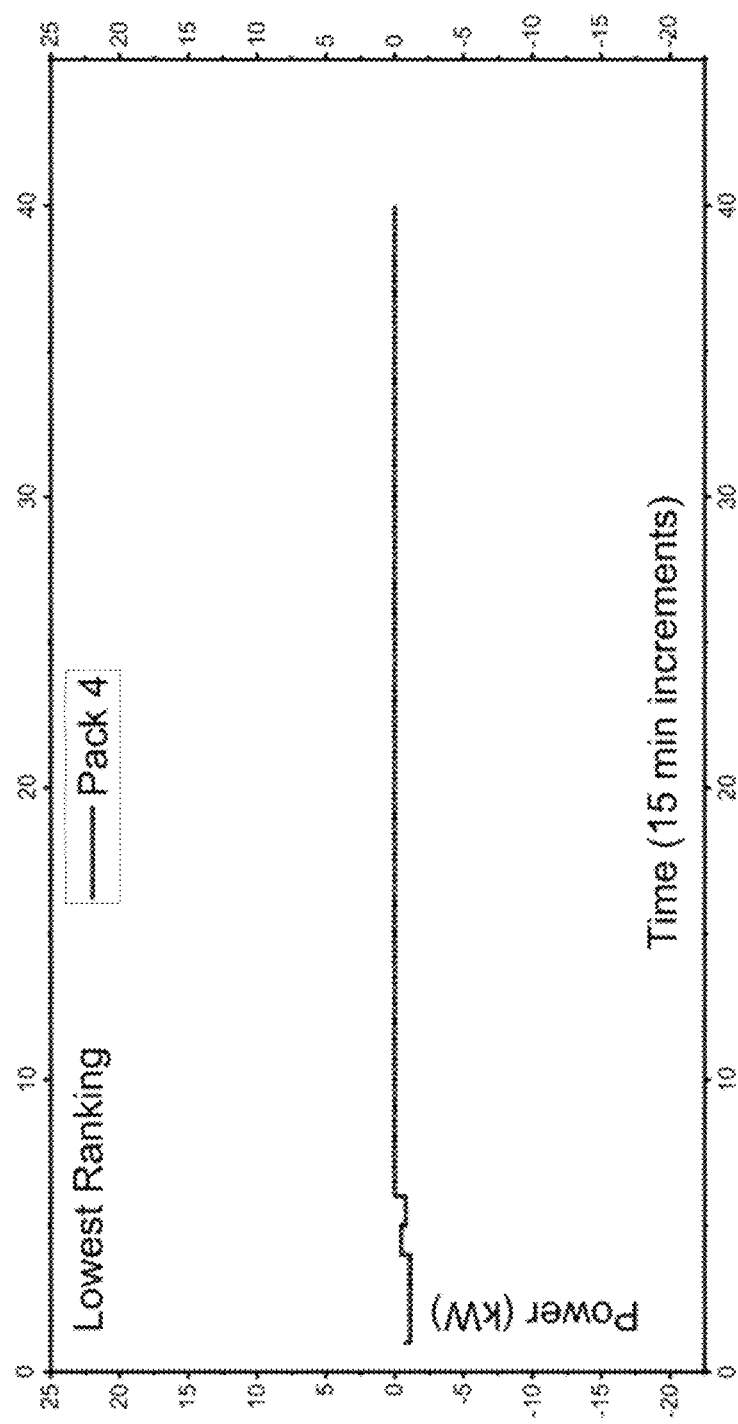

The differences between FIGS. 6-9 and FIGS. 11-14 are most evident when FIG. 9 and FIG. 14 are compared. Battery pack 4 is the strongest pack. As shown in FIG. 5, Pack 4 is used significantly for equal ranking. But as shown in FIG. 14, Pack 4 is used less frequently. So its life is extended. The weak packs are used more frequently and will be replaced when it is not workable. The two sets of figures and tables show that the power profiles for the battery packs are significantly different between the experimental sample and the comparative sample. This rank order results in more usage of "lower quality" packs more often, so they will be replaced. This will lead to a more uniform spectrum of battery packs as the energy storage system ages.

The methods and system described herein may be at least partially embodied in the form of computer-implemented processes and apparatus for practicing those processes. The disclosed methods may also be at least partially embodied in the form of tangible, non-transient machine readable storage media encoded with computer program code. The media may include, for example, RAMs, ROMs, CD-ROMs, DVD-ROMs, BD-ROMs, hard disk drives, flash memories, or any other non-transient machine-readable storage medium, or any combination of these mediums, wherein, when the computer program code is loaded into and executed by a computer, the computer becomes an apparatus for practicing the method. The methods may also be at least partially embodied in the form of a computer into which computer program code is loaded and/or executed, such that, the computer becomes an apparatus for practicing the methods. When implemented on a general-purpose processor, the computer program code segments configure the processor to create specific logic circuits. The methods may alternatively be at least partially embodied in a digital signal processor formed of application specific integrated circuits for performing the methods. The computer or the control unit may be operated remotely using a cloud based system.

Although the subject matter has been described in terms of exemplary embodiments, it is not limited thereto. Rather, the appended claims should be construed broadly, to include other variants and embodiments, which may be made by those skilled in the art.

What is claimed is:

1. A system, comprising:
    a plurality of battery packs;
    one or more power converters, each power converter coupled with at least one of the plurality of battery packs and configured to convert direct current (DC) from one battery pack to alternating current (AC) or vice versa; and
    a controller coupled to the plurality of battery packs and the one or more power converters, the controller comprising one or more processor and at least one tangible, non-transitory machine readable medium encoded with one or more programs configured to perform steps of:
        receiving a total power demand (D) needed to be dispatched from the system or to be charged to the system;
        collecting characteristic data of each battery pack including a maximum voltage ($V_{i\ max}$), a minimum voltage for discharge ($V_{i\ min}$), and a present voltage ($V_i$);
        determining a voltage distribution parameter ($V_i^*$) of each battery pack based on $V_{i\ max}$, $V_{i\ min}$, and $V_i$;
        ranking the plurality of battery packs by assigning a rank to each battery pack as an order for discharging or charging based on the voltage distribution parameter ($V_i^*$) for each battery pack;
        determining a respective power discharge or charge for each battery pack based on the rank of each battery pack and the total power demand (D); and
        providing signals with instructions to the plurality of battery packs and the one or more power converters for discharging power from or charging power to the plurality of battery packs based on the respective power discharge or charge of each battery pack and/or keeping a certain battery pack idle,
    wherein the controller is configured to determine the respective power discharge or charge for each battery pack by assigning the respective power discharge or charge in the order for discharging or charging, starting from the battery pack assigned with rank "1", the power discharge or charge of the battery pack is equal to a respective maximum total rated power ($d_{i\ max}$) of the battery pack, until a total power discharge or charge reaches the total power demand (D), and
    wherein the maximum total rated power ($d_{i\ max}$) of each battery pack is calculated by dividing the capacity of the individual battery pack by a duration of the system, the duration being calculated by dividing the capacity of all the battery packs by the design charge power of the system.

2. The system of claim 1, wherein the plurality of battery packs are heterogeneous battery packs selected from new batteries, second-use electric vehicle (EV) batteries, or combinations thereof.

3. The system of claim 1, further comprising one or more battery power management unit (BPMU), each BPMU connected with one or more battery packs and configured to monitor the one or more battery packs and provide characteristic data of the one or more battery packs to the controller.

4. The system of claim 1, wherein the controller is configured to rank the plurality of battery packs in an increasing order, a decreasing order, or a random order of the voltage distribution parameter ($V_i^*$) of each battery pack, and the power is discharged or charged in the increasing order, the decreasing order, or the random order of the voltage distribution parameter ($V_i^*$), respectively.

5. The system of claim 1, wherein the system is an electrical energy storage system, and the total power demand is provided from an upper level energy management system.

6. The system of claim 1, wherein the controller is configured to provide the signal with instructions for a pre-determined time interval, and re-determine the respective power discharge or charge for each battery pack after the time interval ends or when a voltage collapse occurs to a battery pack, by repeating steps.

7. A controller for controlling discharge or charge of a system comprising a plurality of battery packs, comprising one or more processor and at least one tangible, non-transitory machine readable medium encoded with one or more programs configured to perform steps of:
    receiving a total power demand (D) needed to be dispatched from the system or to be charged to the system;
    collecting characteristic data of each battery pack including a maximum voltage ($V_{i\ max}$), a minimum voltage for discharge ($V_{i\ mm}$), and a present voltage ($V_i$);
    determining a voltage distribution parameter ($V_i^*$) of each battery pack based on $V_{i\ max}$, $V_{i\ min}$, and $V_i$;
    ranking the plurality of battery packs by assigning a rank to each battery pack as an order for discharging or charging based on the voltage distribution parameter ($V_i^*$) for each battery pack;
    determining a respective power discharge or charge for each battery pack based on the rank of each battery pack and the total power demand (D); and
    providing signals with instructions to the plurality of battery packs and one or more power converters for discharging power from or charging power to the plurality of battery packs based on the respective power discharge or charge of each battery pack and/or keeping a certain battery pack idle,
    wherein the controller is configured to determine the respective power discharge or charge for each battery pack by assigning the respective power discharge or charge in the order for discharging or charging, starting from the battery pack assigned with rank "1", the power discharge or charge of the battery pack is equal to a respective maximum total rated power ($d_{i\ max}$) of the battery pack, until a total power discharge or charge reaches the total power demand (D), and
    wherein the maximum total rated power ($d_{i\ max}$) of each battery pack is calculated by dividing the capacity of the individual battery pack by a duration of the system, the duration being calculated by dividing the capacity of all the battery packs by the design charge power of the system.

8. The controller of claim 7, wherein the controller is configured to rank the plurality of battery packs in an increasing order, a decreasing order, or a random order of the voltage distribution parameter ($V_i^*$) of each battery pack, and the power is discharged or charged in the increasing order, the decreasing order, or the random order of the voltage distribution parameter ($V_i^*$), respectively.

9. The controller of claim 7, wherein the controller is configured to provide the signal with instructions for a pre-determined time interval, and re-determine the respective power discharge or charge for each battery pack after the time interval ends or when a voltage collapse occurs to a battery pack, by repeating steps.

10. The controller of claim 7, wherein the controller is configured to discharge power from the plurality of battery packs to a grid or load, or charge power from the grid or load to the plurality of battery packs.

11. A method for controlling discharge or charge of a system comprising a plurality of battery packs through a controller therein, comprising:
receiving a total power demand (D) needed to be dispatched from the system or to be charged to the system;
collecting characteristic data of each battery pack including a maximum voltage ($V_i$ max), a minimum voltage for discharge ($V_{i\ min}$), and a present voltage ($V_i$);
determining a voltage distribution parameter ($V_i^*$) of each battery pack based on $V_{i\ max}$, $V_{i\ min}$, and $V_i$;
ranking the plurality of battery packs by assigning a rank to each battery pack as an order for discharging or charging based on the voltage distribution parameter ($V_i^*$) for each battery pack;
determining a respective power discharge or charge for each battery pack based on the rank of each battery pack and the total power demand (D); and
providing signals with instructions to the plurality of battery packs and one or more power converters for discharging power from or charging power to the plurality of battery packs based on the respective power discharge or charge of each battery pack and/or keeping a certain battery pack idle, wherein the respective power discharge or charge for each battery pack is determined by assigning the respective power discharge or charge in the order for discharging or charging, starting from the battery pack assigned with rank "1", the power discharge or charge of the battery pack is equal to a respective maximum total rated power ($d_{i\ max}$) of the battery pack, a total power discharge or charge reaches until the total power demand (D), and wherein the maximum total rated power ($d_{i\ max}$) of each battery pack is calculated by dividing the capacity of the individual battery pack by a duration of the system, the duration being calculated by dividing the capacity of all the battery packs by the design charge power of the system.

12. The method of claim 11, wherein the plurality of battery packs are heterogeneous battery packs selected from new batteries, second-use electric vehicle (EV) batteries, or combinations thereof.

13. The method of claim 11, wherein
the voltage distribution parameter ($V_i^*$) of each battery pack is determined using Equation (1):

$$V_i^* = (V_i - V_{i\ min})/(V_{i\ max} - V_{i\ min}) \qquad (1).$$

14. The method of claim 11, wherein the plurality of battery packs are ranked in an increasing order of the voltage distribution parameter ($V_i^*$) of each battery pack.

15. The method of claim 11, wherein the plurality of battery packs are ranked in a decreasing order of the voltage distribution parameter ($V_i^*$) of each battery pack.

16. The method of claim 11, wherein the plurality of battery packs are ranked in a random order of the voltage distribution parameter ($V_i^*$) of each battery pack.

17. The method of claim 11, wherein a certain battery pack is kept idle when the respective power discharge or charge is assigned to zero.

18. The method of claim 11, further comprising: repeating some or all the steps to redetermine the respective power discharge or charge of each battery pack after a pre-determined time interval ends or when a voltage collapse occurs to a battery pack.

* * * * *